(12) United States Patent
Suda et al.

(10) Patent No.: US 8,938,028 B2
(45) Date of Patent: Jan. 20, 2015

(54) RADIO COMMUNICATIONS APPARATUS AND COMMUNICATION METHOD

(75) Inventors: Kenji Suda, Kawasaki (JP); Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1379 days.

(21) Appl. No.: 12/332,319

(22) Filed: Dec. 10, 2008

(65) Prior Publication Data

US 2009/0196363 A1  Aug. 6, 2009

(30) Foreign Application Priority Data

Jan. 31, 2008  (JP) ................ 2008-021105

(51) Int. Cl.
*H04L 27/00* (2006.01)
*H04B 7/06* (2006.01)
*H04W 52/32* (2009.01)
*H04W 52/42* (2009.01)

(52) U.S. Cl.
CPC ........... *H04B 7/0613* (2013.01); *H04W 52/325* (2013.01); *H04W 52/42* (2013.01)
USPC ............ 375/299; 375/267; 455/101; 370/204

(58) Field of Classification Search
None
See application file for complete search history.

(56) References Cited

U.S. PATENT DOCUMENTS

| 8,416,872 | B2 | 4/2013 | Higuchi et al. | |
| 2009/0092039 | A1* | 4/2009 | Niu et al. | 370/208 |
| 2009/0232243 | A1* | 9/2009 | Tsuboi et al. | 375/267 |

FOREIGN PATENT DOCUMENTS

JP  2007-028569  2/2007

OTHER PUBLICATIONS

3GPP TS 36.321 V8.0.0 (Dec. 2007) (Internet URL:http://www.3gpp.org/ftp/Specs/html-info/36321.htm), Technical Specification Group Radio Access Network; Evolved Universal Terrestrial Radio Access (E-UTRA) Medium Access Control (MAC) protocol specification (Release 8).
3GPP TS 36.300 V8.3.0 (Dec. 2007) (Internet URL:http://www.3gpp.orgiftp/Specs/html-info/36300.htm), Technical Specification Group Radio Access Network; Evolved Universal Terrestrial Radio Access (E-UTRA) and Evolved Universal Terrestrial Radio Access Network (E-UTRAN); Overall description; Stage 2 (Release 8).
Yuda, Y., Hiramatsu, K., Hoshino, M., and Homma, K., "A Study on Link Adaptation Scheme with Multiple Code Words for Spectral Efficiency Improvement on OFDM-MIMO Systems," IEICE Trans. Fundamentals, Vol. E90-A, No. 11 Nov. 2007.
Office Action issued for corresponding Japanese Patent Application No. 2013-016715, mailed Dec. 17, 2013, with a partial English translation.

(Continued)

*Primary Examiner* — Adolf Dsouza
(74) *Attorney, Agent, or Firm* — Myers Wolin, LLC

(57) ABSTRACT

A radio communications apparatus transmitting data using multiple antennas is disclosed that includes a data link layer control information generation part configured to generate multiple data link layer control information items from generated data link layer control information; a data unit generation part configured to generate multiple data units to be transmitted through the corresponding antennas, based on the data link layer control information items generated by the data link layer control information generation part, so that the data units include the data link layer control information items; and a physical layer processing part configured to perform adaptive modulation and coding on the data units.

9 Claims, 18 Drawing Sheets

(56) References Cited

OTHER PUBLICATIONS

Panasonic, "Channel Coding Structure for LTE downlink", Agenda Item: 10.1.6, Mar. 27-31, 2006, 3GPP TSG-RAN WG1 #44bis meeting, R1-060794, 3rd Generation Partnership Project (3GPP), Athens, Greece.

Philips, "Mapping between higher-layer PDUs and resource blocks in E-UTRA", Agenda Item: 13.1.3, Feb. 13-17, 2006, 3GPP TSG RAN WG1 meeting #44, R1-060556, 3rd Generation Partnership Project (3GPP), Denver, USA.

Nokia Corporation et al., "MAC Header Format", Agenda Item: 5.1.1.2, Oct. 8-12, 2007, R2-073891, 3GPP TSG-RAN WG2 Meeting #59bis, 3rd Generation Partnership Project (3GPP), Shanghai, China.

Partial European search report issued for corresponding European Patent Application No. 08171658.1, dated Jul. 16, 2014.

Extended European search report issued for corresponding European Patent Application No. 08171658.1, dated Nov. 3, 2014.

\* cited by examiner

RADIO COMMUNICATIONS APPARATUS AND COMMUNICATION METHOD

CROSS-REFERENCE TO RELATED APPLICATIONS

This application is based upon and claims the benefit of priority of the prior Japanese Patent Application No. 2008-021105, filed on Jan. 31, 2008, the entire contents of which are incorporated herein by reference.

FIELD

The present invention relates generally to radio communications using Multiple Input Multiple Output (MIMO) transmission, which employs multiple antennas to transmit and receive data, and more particularly to a radio communications apparatus and a communication method that transmit control information using upper layers of the Physical Layer, in particular, the Medium Access Control (MAC) layer.

BACKGROUND

Currently, the $3^{rd}$ Generation Partnership Project (3GPP) is working on radio access systems in the mobile communications system next in generation to the third-generation (3G) mobile communications system. This next-generation mobile communications system may also be referred to as "Long Term Evolution (LTE)." Alternatively, this next-generation mobile communications system may also be referred to as "Evolved Universal Terrestrial Radio Access (E-UTRA) and Evolved Universal Terrestrial Radio Access Network (E-UTRAN)."

In LTE, it has been determined that control information be introduced in the MAC layer as well, so that control information is defined in the MAC layer. (See, for example, 3GPP TS 36.321.) This control information may also be referred to as "MAC Control element."

The control information that should be transmitted frequently needs to be transmitted in the L1 layer (Layer 1). Further, the control information that may be transmitted with a longer period (at a lower frequency) may be transmitted in upper layers of the MAC layer. In the case of transmission in upper layers, radio resources are consumed. Therefore, LTE has introduced control information in the MAC layer in order to transmit control information somewhat frequently.

A description is given, with reference to FIG. 1, of the protocol stack defined in LTE. (See, for example, 3GPP TS 36.300.)

Mobile communications systems to which LTE is applied include user equipment (UE) 5. The protocol stack of the UE 5 includes the Physical layer (PHY), the MAC layer, the Radio Link Control (RLC) layer, the Packet Data Convergence Protocol (PDCP) layer, the Radio Resource Control (RRC) layer, and Non-Access Stratum (NAS).

Further, mobile communications systems to which LTE is applied include a base station (eNodeB or eNB, which stands for E-UTRAN NodeB) 6. The protocol stack of the eNB 6 includes the PHY, MAC layer, RLC layer, PDCP layer, and RRC layer.

Further, mobile communications systems to which LTE is applied may also include a mobility management entity (MME) 7. The protocol stack of the MME 7 includes NAS.

In the above-described protocol stacks, the PHY may also be referred to as "L1 (Layer 1)." Further, the MAC layer, RLC layer, and PDCP layer form the Data Link Layer, which may also be referred to as "L2 (Layer 2)."

A description is given, with reference to FIG. 2, of the data configuration of the MAC layer. A MAC Protocol Data Unit (MAC PDU) 10 includes a MAC header 10-1, zero or more MAC Service Data Units (MAC SDU) 10-2, zero or more MAC Control elements 10-3, and optionally padding 10-4.

The MAC header 10-1 includes one or more MAC PDU sub-headers 10-10, each corresponding to either the MAC SDU 10-2, the MAC Control element 10-3, or the padding 10-4. The MAC PDU sub-header 10-10 corresponding to the MAC SDU 10-2 includes multiple header fields including LCID/E/R/R/F/L.

Next, a description is given, with reference to FIG. 3, of a method of attaching a MAC Control element.

An RLC PDU 12 is divided, so that a MAC SDU 14 is configured. That is, the MAC SDU 14 is cut out from the RLC PDU 12. A MAC Control element 16 and a header 17 are added to the MAC SDU 14, so that a MAC PDU 18 is formed. The MAC PDU 18 is transmitted in a transport block size (TBS) 19 from an antenna. This transport block size may also be referred to as "Code Word (CW)." Here, a description is given of the case where the MAC SDU 14 is generated from the divided RLC PDU 12. Alternatively, multiple RLC PDUs may be united and a MAC SDU may be generated from the united RLC PDUs.

Further, in LTE, it has been determined to introduce the MIMO transmission technology that transmits different information items from multiple antennas. The introduction of this MIMO transmission technology makes it possible to further increase transmission speed. Further, it has also been determined to introduce the Multi Code Word (MCW) technology. (See, for example, Yuda, Y., K. Hiramatsu, M. Hoshino and K. HOMMA; "A Study on Link Adaptation Scheme with Multiple Code Words for Spectral Efficiency Improvement on OFDM-MIMO Systems," IEICE TRANS. FUNDAMENTALS, VOL. E90-A, NO. 11 NOVEMBER 2007.) According to MCW, in transmitting different information items from multiple antennas, not a single information item but the multiple information items from the MAC layer are encoded in the PHY independent of each other through application of Adaptive Modulation and Coding (AMC). Further, retransmission control is also performed independently in each antenna. For example, as illustrated in FIG. 4, RLC PDUs 12a and 12b are divided, and MAC PDUs 18a and 18b to be transmitted from antennas #1 and #2 are generated from the divided RLC PDUs 12a and 12b, respectively. Each of the MAC PDUs 18a and 18b is transmitted in a corresponding transport block size TBS #1 19a or TBS #2 19b (code word CW #1 or #2) from the corresponding antenna #1 or #2.

However, the above-described background art has problems such as the following.

No method of transmitting a MAC Control element in the case of performing MIMO transmission based on the MCW technology is determined.

For example, if a MAC Control element has been transmitted from one of multiple antennas, it takes time before the MAC Control element is retransmitted in the case of occurrence of an error in the code word in which the MAC Control element has been transmitted at the receiving end.

For example, as illustrated in FIG. 5, the RLC PDUs 12a and 12b are divided, and the MAC PDUs 18a and 18b to be transmitted from the antennas #1 and #2 are generated from the divided RLC PDUs 12a and 12b (MAC SDUs 14a and 14b), respectively. Of the MAC PDUs 18a and 18b to be transmitted from the antennas #1 and #2, respectively, the MAC PDU 18a to be transmitted from the antenna #1 includes a MAC Control element 16a. The MAC PDUs 18a and 18b are transmitted from the antennas #1 and #2 in their respective transport block sizes TBS #1 19a and TBS #2 19b (CW #1 and CW #2).

If control information in which an error has occurred is frequently transmitted as the control information transmitted in the L1 layer, it is possible to transmit (retransmit) the control information immediately after the occurrence of the error because the transmission period is short. In the case of occurrence of an error in control information (L2 control information) that is transmitted somewhat frequently but with a transmission period longer than that for control information transmitted in the L1 layer and shorter than that for control information transmitted in upper layers, it is also necessary to wait until the next transmission or retransmission time. However, the effect of delay is greater because of a longer transmission or retransmission period.

SUMMARY

According to one embodiment of the present invention, a radio communications apparatus and a communication method are provided that can reduce reception error of control information transmitted in the Data Link Layer (L2 layer).

According to one embodiment of the present invention, a radio communications apparatus transmitting data using a plurality of antennas is provided that includes a data link layer control information generation part configured to generate a plurality of data link layer control information items from generated data link layer control information; a data unit generation part configured to generate a plurality of data units to be transmitted through the corresponding antennas, based on the data link layer control information items generated by the data link layer control information generation part, so that the data units include the data link layer control information items; and a physical layer processing part configured to perform adaptive modulation and coding on the data units.

According to one embodiment of the present invention, a radio communications apparatus transmitting data using a plurality of antennas is provided that includes a data unit generation part configured to generate a plurality of data units so that a first one of the data units includes data link layer control information; a physical layer processing part configure to perform adaptive modulation and coding on the data units; and a transmission power control part configured to assign higher transmission power to the first one of the data units than to a second one of the data units without the data link layer control information.

According to one embodiment of the present invention, a radio communications apparatus transmitting data using a plurality of antennas is provided that includes a data unit generation part configured to generate a plurality of first data units based on generated data link layer control information; and a physical layer processing part configure to perform adaptive modulation and coding on the first data units, wherein the data unit generation part is configured to generate the first data units by attaching the data link layer control information to at least one of second data units based on priority information included in the second data units.

According to one embodiment of the present invention, a communication method transmitting data using a plurality of antennas is provided that includes the steps of generating a plurality of data link layer control information items from generated data link layer control information; generating a plurality of data units to be transmitted through the corresponding antennas, based on the generated data link layer control information items, so that the data units include the data link layer control information items; and performing adaptive modulation and coding on the data units.

According to one embodiment of the present invention, a communication method transmitting data using a plurality of antennas is provided that includes the steps of generating a plurality of data units so that a first one of the data units includes data link layer control information; performing adaptive modulation and coding on the data units; and assigning higher transmission power to the first one of the data units than to a second one of the data units without the data link layer control information.

According to one embodiment of the present invention, a communication method transmitting data using a plurality of antennas is provided that includes the steps of generating a plurality of first data units by attaching data link layer control information to a first one of second data units based on priority information included in the second data units, the first one of the second data units having a higher priority than a second of the second data units; and performing adaptive modulation and coding on the first data units.

According to one aspect of the present invention, it is possible to reduce reception error of control information transmitted in the Data Link Layer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
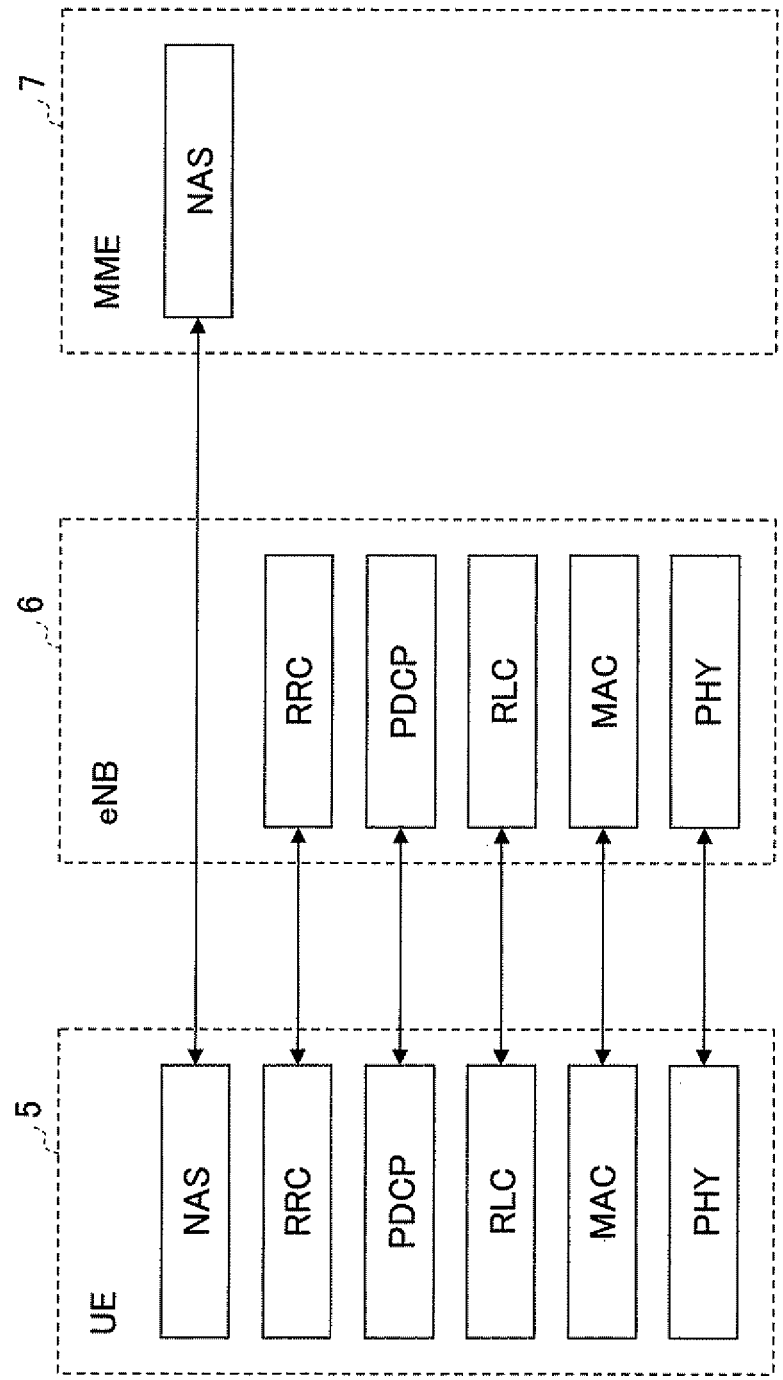
FIG. 1 is a diagram illustrating a protocol stack in the next-generation mobile communications system.
Figure 2:
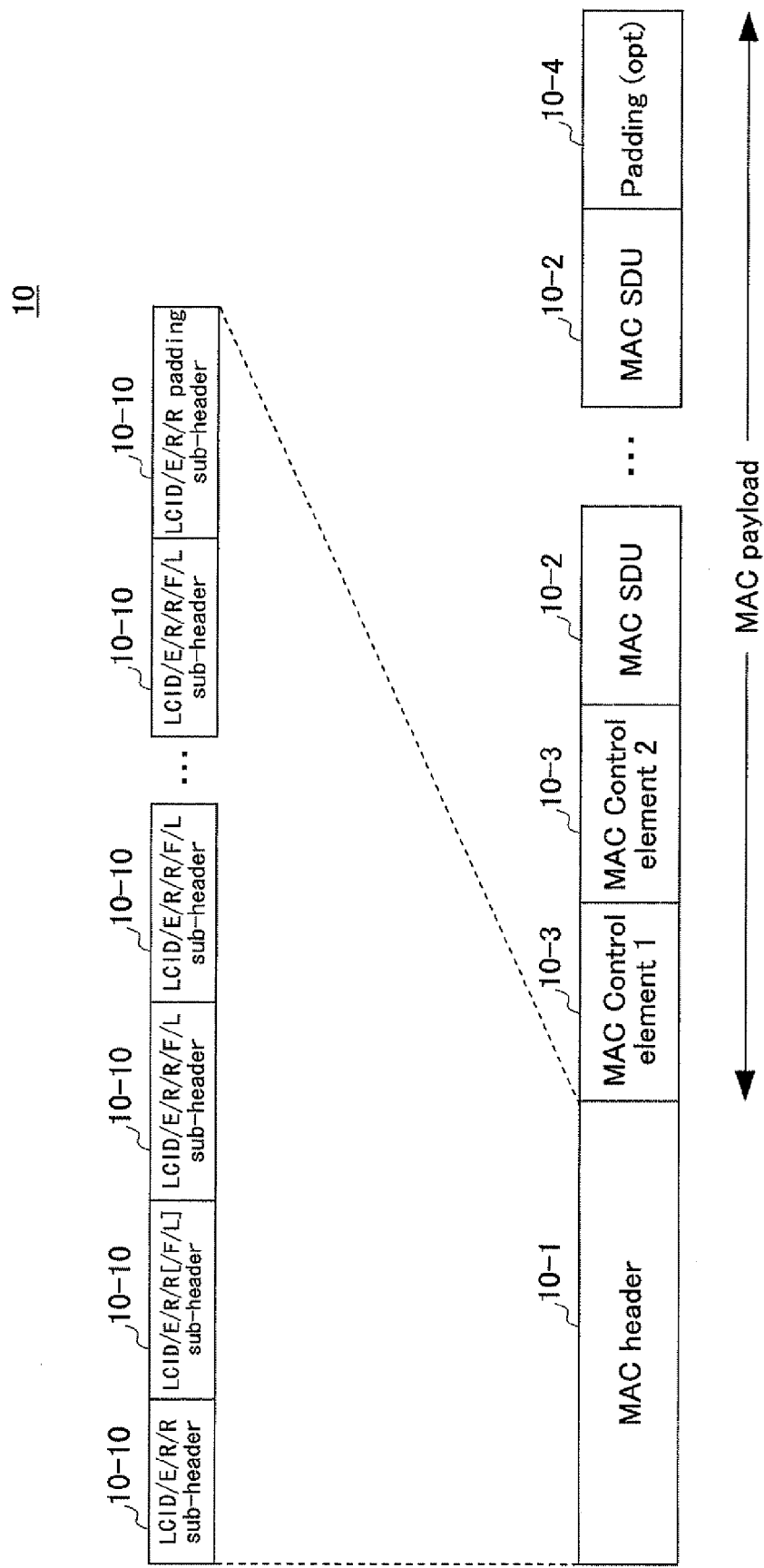
FIG. 2 is a diagram illustrating a configuration of a MAC PDU.
Figure 3:
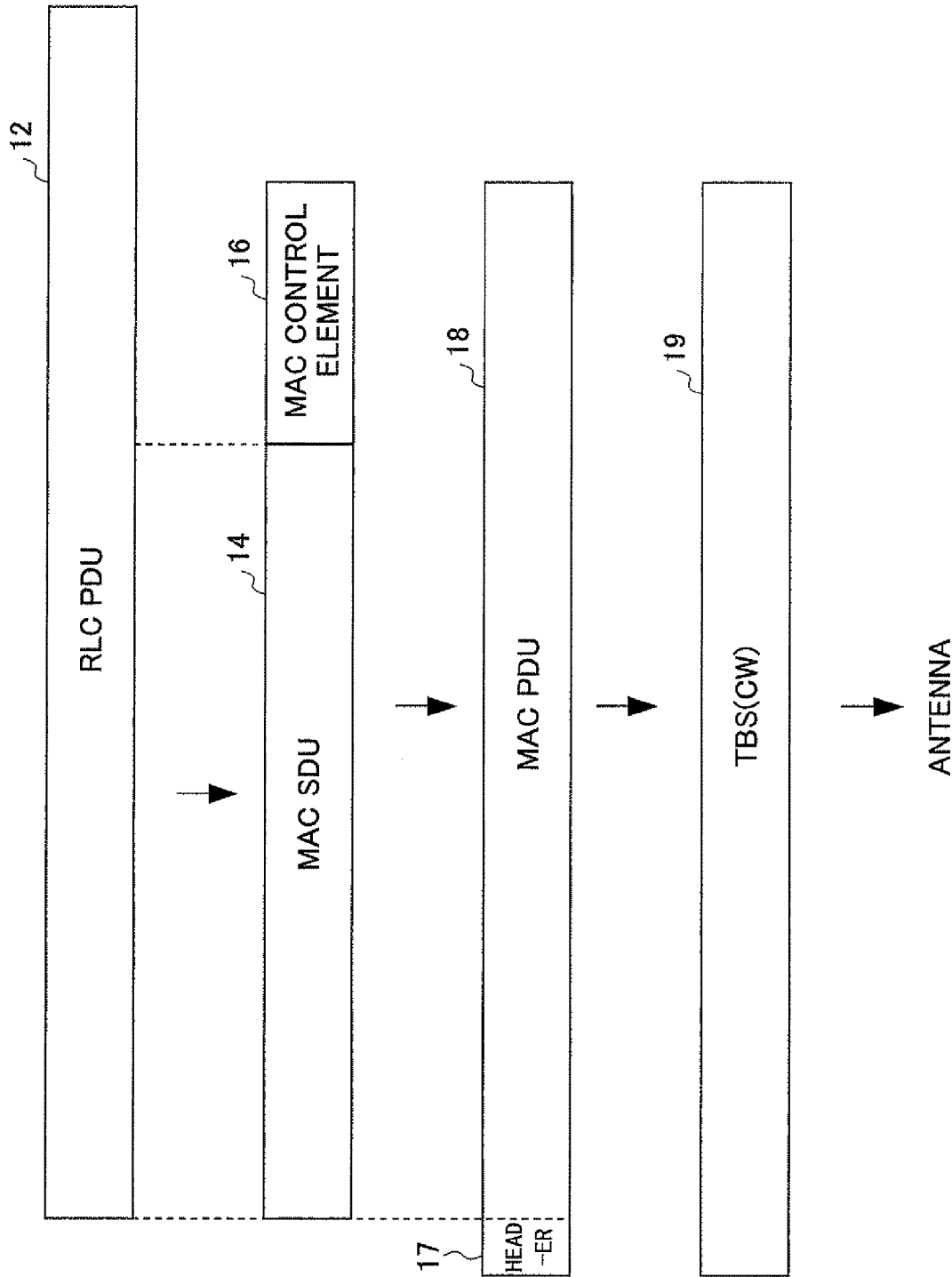
FIG. 3 is a diagram illustrating a method of attaching a MAC Control element.
Figure 4:
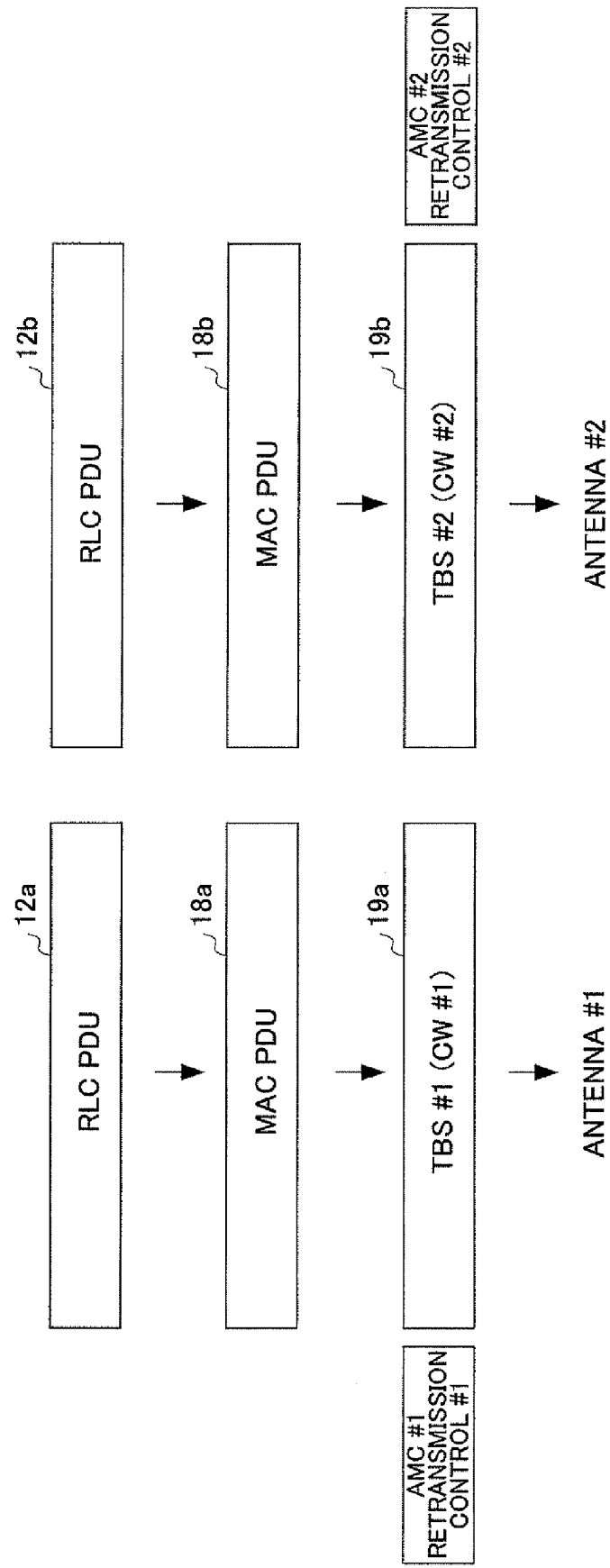
FIG. 4 is a diagram illustrating the Multiple Code Word technology.
Figure 5:
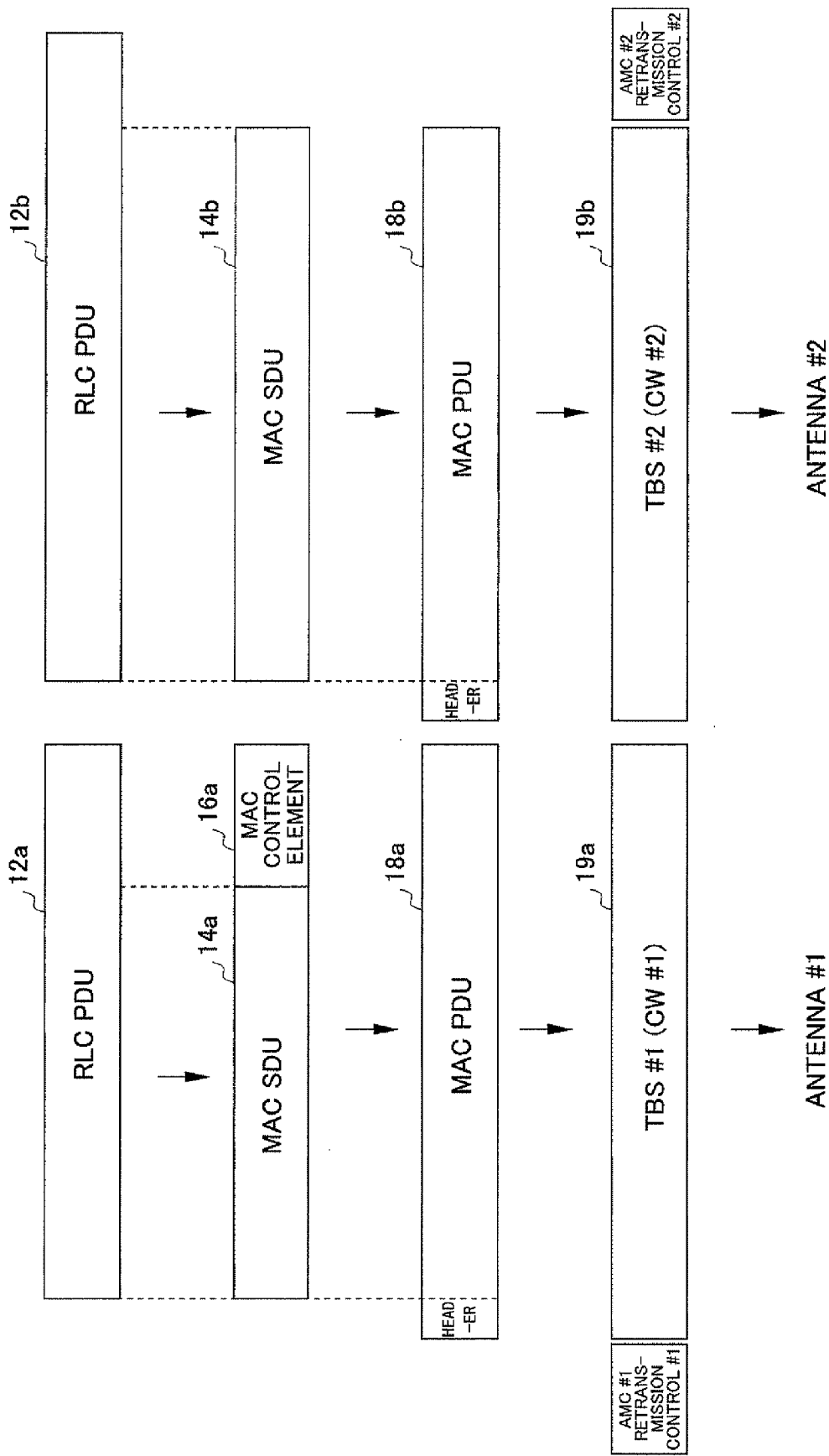
FIG. 5 is another diagram illustrating the Multiple Code Word technology.

A description is given below, with reference to the accompanying drawings, of embodiments of the present invention. In the drawings for illustrating the embodiments, elements having the same function are referred to by the same reference numeral, and redundant descriptions thereof are omitted.

[First Embodiment]

A description is given of a radio communications system to which a radio communications apparatus is applied according to a first embodiment of the present invention.

The radio communications system according to this embodiment transmits and receives data using multiple antennas. For example, the MIMO transmission technology is applied to the radio communications system of this embodiment. Further, the MCW technology is applied to the radio communications system of this embodiment. Examples of the radio communications system having such characteristics include a system to which LTE is applied. Accordingly, by way of example, a description is given of a system to which LTE is applied in this embodiment. However, the present invention is also applicable to systems other than those to which LTE is applied as long as they have the above-described characteristics. The system to which LTE is applied may be referred to as "Evolved UTRA and UTRAN" as described above.

The radio communications system of this embodiment includes user equipment (UE) and a base station (eNodeB or eNB). The UE may also be referred to as "mobile station." Each of the mobile station and the base station includes a radio communications apparatus.

The radio communications system of LTE has Orthogonal Frequency Division Multiplexing (OFDM) and Single-Carrier Frequency Division Multiplexing Access (SC-FDMA) applied to downlink and uplink, respectively, as radio access systems. OFDM splits a frequency band into multiple narrow frequency bands (subcarriers) and transmits data over each frequency band. SC-FDMA splits a frequency band and performs transmission using different frequency bands for multiple terminals, thereby making it possible to reduce the interference between the terminals.

Figure 6:
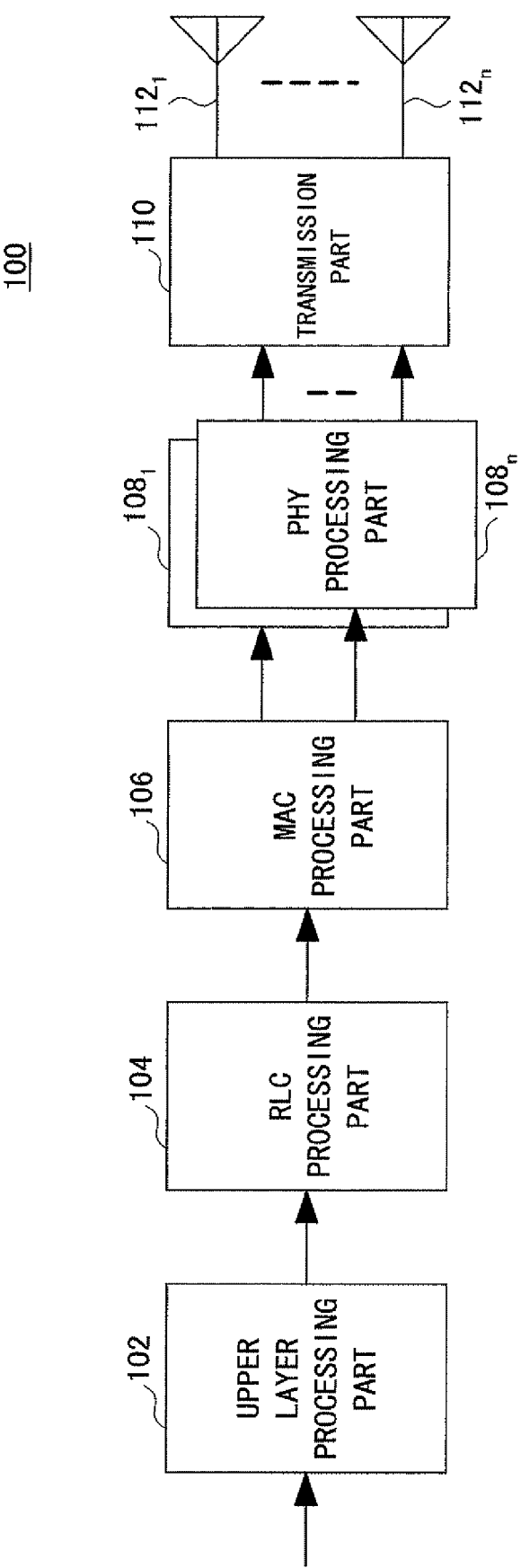
FIG. 6 is a block diagram illustrating a radio communications apparatus according to a first embodiment of the present invention.

A description is given, with reference to FIG. 6, of a radio communications apparatus 100 according to this embodiment.

The radio communications apparatus 100 according to this embodiment is provided in each of a mobile station and a base station. In other words, each of the mobile station and the base station includes the radio communications apparatus 100.

Referring to FIG. 6, the radio communications apparatus 100 includes multiple antennas $112_1$ through $112_n$ (n is an integer greater than zero), and performs MIMO transmission using the antennas $112_1$ through $112_n$. If the radio communications apparatus 100 is provided in the mobile station, the radio communications apparatus 100 transmits an uplink signal in accordance with scheduling by the base station. If the radio communications apparatus 100 is provided in the base station, the radio communications apparatus 100 performs scheduling and transmits a downlink signal. For example, the radio communications apparatus 100 provided in the base station performs RLC processing, MAC processing, and PHY processing on a signal from an upper layer, and transmits the signal from each of the antennas $112_1$ through $112_n$.

The radio communications apparatus 100 includes an upper layer processing part 102. If the radio communications apparatus 100 is provided in the base station, the upper layer processing part 102 performs upper-layer-related processing on a signal transmitted from an upper (superior) station. Here, the upper station may be an MME. Further, if the radio communications apparatus 100 is provided in the mobile station, the upper layer processing part 102 performs upper-layer-related processing on information input by a user and/or a voice signal produced by the user or a signal generated based on other sound. Further, the upper layer may be the RRC layer. The upper layer processing part 102 inputs the signal subjected to the upper-layer-related processing to an RLC processing part 104 described below.

The radio communications apparatus 100 includes the RLC processing part 104. The RLC processing part 104 performs RLC-layer-related processing on the signal input by the upper layer processing part 102. Then, the RLC processing part 104 inputs the signal subjected to the RLC-layer-related processing (RLC PDU) to a MAC processing part 106 described below.

The radio communications apparatus 100 includes the MAC processing part 106. The MAC processing part 106 performs MAC-layer-related processing on the signal (RLC PDU) input by the RLC processing part 104. For example, the MAC processing part 106 divides the RLC PDU to generate a MAC SDU. That is, the MAC processing part 106 cuts out a MAC SDU from the RLC PDU. Multiple MAC SDUs may be cut out from the RLC PDU. Then, the MAC processing part 106 adds a MAC control element and a header to the generated MAC SDU, thereby generating a MAC PDU. Then, the MAC processing part 106 inputs the MAC PDU in a transport block size to one of PHY processing parts $108_1$ through $108_n$ corresponding to one of the antennas $112_1$ through $112_n$ from which the MAC PDU is to be transmitted. Here, a description is given of the case where the MAC processing part 106 divides an RLC PDU and generates a MAC SDU from the divided RLC PDU. Alternatively, the MAC processing part 106 may unite multiple RLC PDUs and generate a MAC SDU from the united RLC PDUs. This is preferable in the case of short RLC PDUs.

The radio communications apparatus 100 includes the PHY processing parts $108_1$ through $108_n$. Each of the PHY processing parts $108_1$ through $108_n$ performs PHY-related processing on the signal (MAC PDU) input by the MAC processing part 106. For example, the PHY processing parts $108_1$ through $108_n$ perform AMC. In AMC, a modulation method is selected based on radio conditions. For example, a high modulation method is selected in an environment in good radio conditions. As a result, data are transmitted at high rate. On the other hand, a low modulation method is selected in an environment in poor radio conditions. As a result, data transmission is ensured. This AMC processing may be performed for different conditions in the PHY processing parts $108_1$ through $108_n$ corresponding to the antennas $112_1$ through $112_n$. For example, modulation may be performed for different modulation conditions. For example, encoding may be performed at different coding rates. Further, a so-called MCW technique may be applied. Then, each of the PHY processing parts $108_1$ through $108_n$ inputs the signal subjected to AMC to a transmission part 110.

The radio communications apparatus 100 includes the transmission part 110. The transmission part 110 transmits the signals input by the PHY processing parts $108_1$ through $108_n$. For example, the transmission part 110 controls transmission power. The transmission part 110 may assign different transmission power levels to the antennas $112_1$ through $112_n$. The transmission part 110 transmits each of the signals through a corresponding one of the antennas $112_1$ through $112_n$.

Next, a description is given in detail of the MAC processing part 106 of the radio communications apparatus 100 according to this embodiment.

Figure 7:
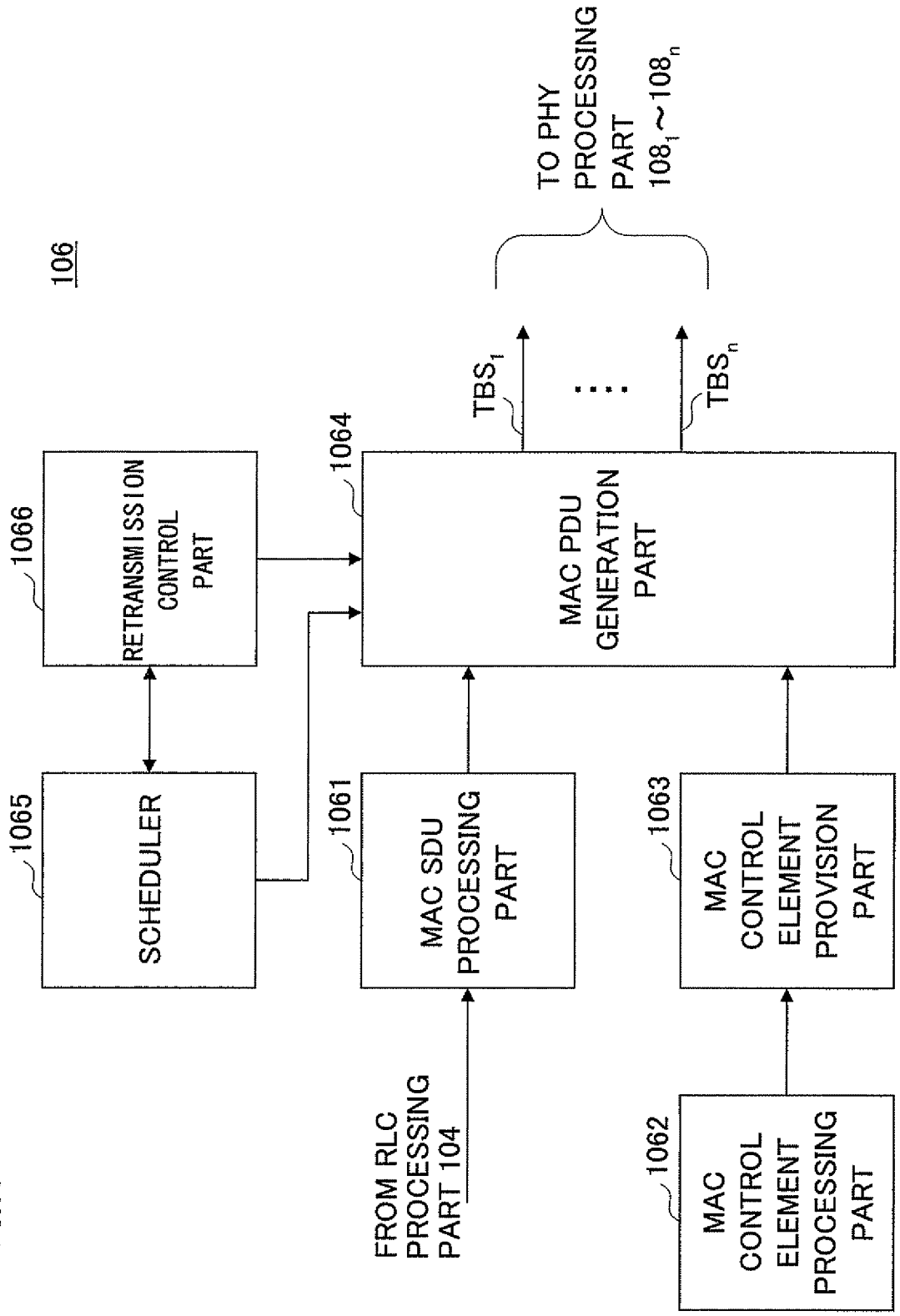
FIG. 7 is a partial block diagram illustrating a configuration of a MAC processing part of the radio communications apparatus according to the first embodiment of the present invention.

A description is given, with reference to FIG. 7, of the MAC processing part 106 of the radio communications apparatus 100 provided in the base station.

Figure 8:
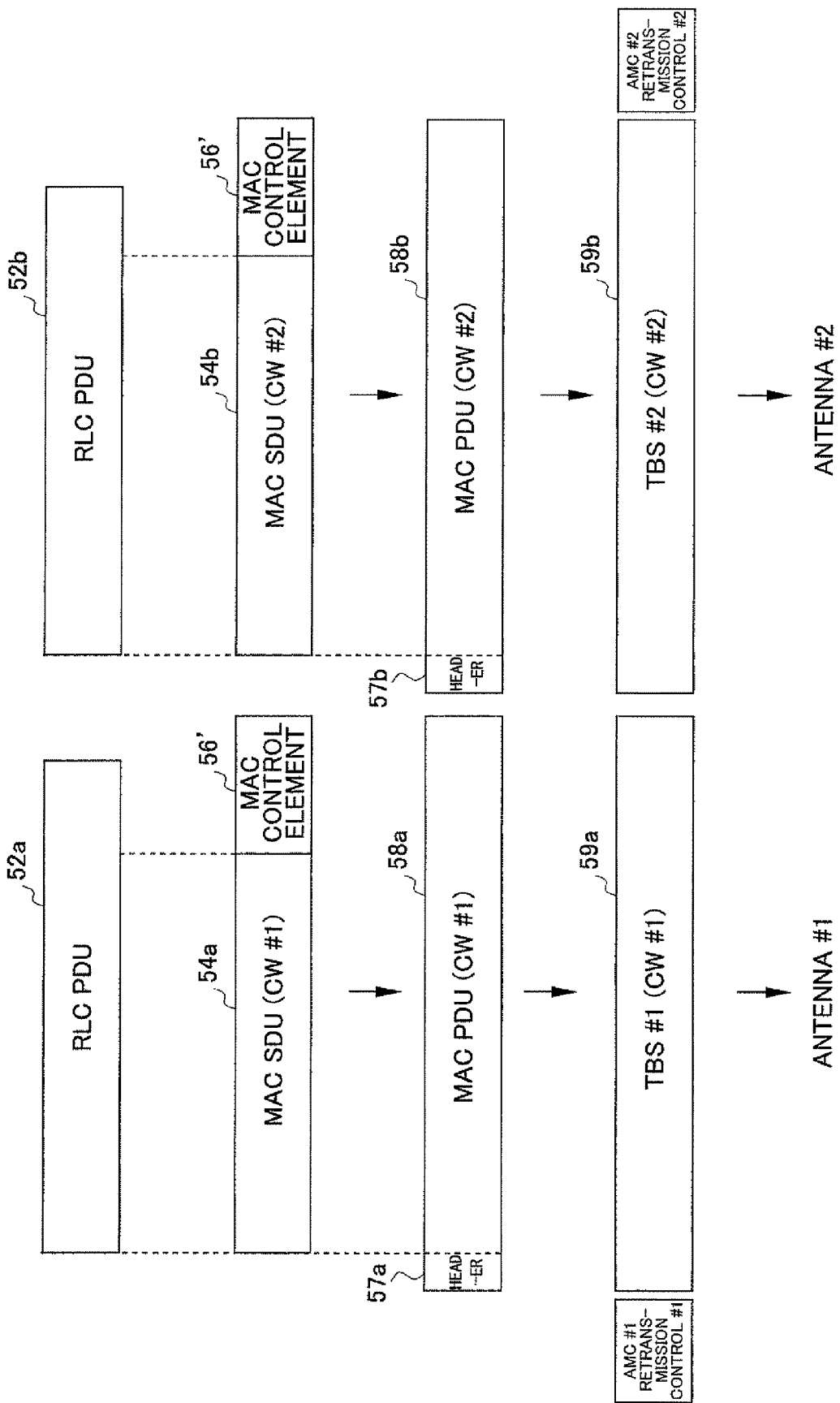
FIG. 8 is a diagram illustrating processing in the radio communications apparatus according to the first embodiment of the present invention.

The MAC processing part 106 includes a MAC SDU processing part 1061. The MAC SDU processing part 1061 divides the signal (RLC PDU) input by the RLC processing part 104 (FIG. 6), and inputs the divided RLC PDU to a MAC PDU generation part 1064 described below. For example, as illustrated in FIG. 8, the MAC SDU processing part 1061 divides the input RLC PDU, thereby generating MAC SDUs 54a and 54b, and inputs the generated MAC SDUs 54a and 54b to the MAC PDU generation part 1064. The MAC SDU may be referred to as "code word (CW)." FIG. 8 illustrates the case where the number of the antennas $112_1$ through $112_n$ of the radio communications apparatus 100 is two (indicated as antennas #1 and #2 in FIG. 8). In this case, the signal (RLC PDU) input by the RLC processing part 104 is divided into two RLC PDUs 52a and 52b. The generated RLC PDUs 52a and 52b are input to the MAC PDU generation part 1064 as the MAC SDUs 54a and 54b, respectively.

Alternatively, the MAC SDU generation part 1061 may unite signals (RLC PDUS) input by the RLC processing part 104 and input the united RLC PDUs to the MAC PDU generation part 1064. For example, the MAC SDU generation part 1061 generates a MAC SDU by uniting multiple RLC PDUs, and inputs the generated MAC SDU to the MAC PDU generation part 1064.

The MAC processing part 106 includes a MAC Control element processing part 1062. The MAC Control element processing part 1062 generates Layer 2 (L2) control information (Data Link Layer control information) transmitted in Layer 2 (L2). The Layer 2 control information includes a MAC Control element. In this embodiment, a description is given of the case of transmitting a MAC Control element as an example of the Layer 2 control information. However, the Layer 2 control information may include control information other than the MAC Control element as long as the control information is transmitted in Layer 2. Then, the MAC Control element processing part 1062 inputs the generated MAC Control element to a MAC Control element provision part 1063. For example, the MAC Control element includes at least one information item selected from a random access channel message (RACH Message) 2, Timing Advance, Discontinuous Reception (DRX), and padding.

The MAC processing part 106 includes the MAC Control element provision part 1063. The MAC Control element provision part 1063 generates multiple MAC Control elements to be provided to MAC SDUs from the MAC Control element input by the MAC Control element processing part 1062. For example, the MAC Control element provision part 1063 may generate multiple MAC Control elements by copying the MAC Control element input by the MAC Control element processing part 1062. For example, the MAC Control element provision part 1063 may generate as many MAC Control elements as the antennas $112_1$ through $112_n$ (FIG. 6) by reproducing the MAC Control element. If the number of antennas is three or more, the number of MAC Control elements copied may be different from the number of antennas as long as at least two MAC Control elements are copied (reproduced) from the input MAC Control element. The MAC control element provision part 1063 inputs the generated MAC control elements to the MAC PDU generation part 1064.

The MAC processing part 106 includes a scheduler 1065. The scheduler 1065 performs scheduling on a downlink shared channel based on the downlink quality information transmitted by the mobile station. This downlink quality information includes a Channel Quality Indicator (CQI).

The MAC processing part 106 includes a retransmission control part 1066. The retransmission control part 1066 controls retransmission of the L2 control information.

The MAC processing part 106 includes the MAC PDU generation part 1064. The MAC PDU generation part 1064 attaches the MAC Control elements input by the MAC Control element provision part 1063 to the MAC SDUs input by the MAC SDU processing part 1061. Then, the MAC PDU generation part 1064 generates MAC PDUs by adding headers to the MAC SDUs having the MAC Control elements attached thereto. For example, the MAC PDU generation part 1064 adds the MAC Control elements and headers to the MAC SDUs, thereby generating MAC PDUs to be transmitted from the corresponding antennas $112_1$ through $112_n$. The MAC PDU generation part 1064 processes the generated MAC PDUs into transport block sizes, and inputs the processed MAC PDUs to the corresponding PHY processing parts $108_1$ through $108_n$ (FIG. 6) corresponding to the antennas $112_1$ through $112_n$. For example, as shown in FIG. 8, which illustrates the case where the number of the antennas $112_1$ through $112_n$ of the radio communications apparatus 100 is two as described above, the MAC PDU generation part 1064 adds MAC Control elements 56' to the MAC SDUs 54a and 54b. Then, the MAC PDU generation part 1064 adds headers 57a and 57b to the MAC SDUs 54a and 54b with the MAC Control elements 56', thereby generating MAC PDUs 58a and 58b. The MAC PDU generation part 1064 processes the generated MAC PDUs 58a and 58b into transport block sizes TBS #59a and TBS #2 59b, and inputs the processed MAC PDUs 58a and 58b to the corresponding PHY processing parts $108_1$ and $108_2$ corresponding to the antennas $112_1$ and $112_2$. Here, there may be a MAC PDU that does not include the MAC Control element among the generated MAC PDUs if at least two of the MAC PDUs generated include the MAC Control element.

Figure 9:
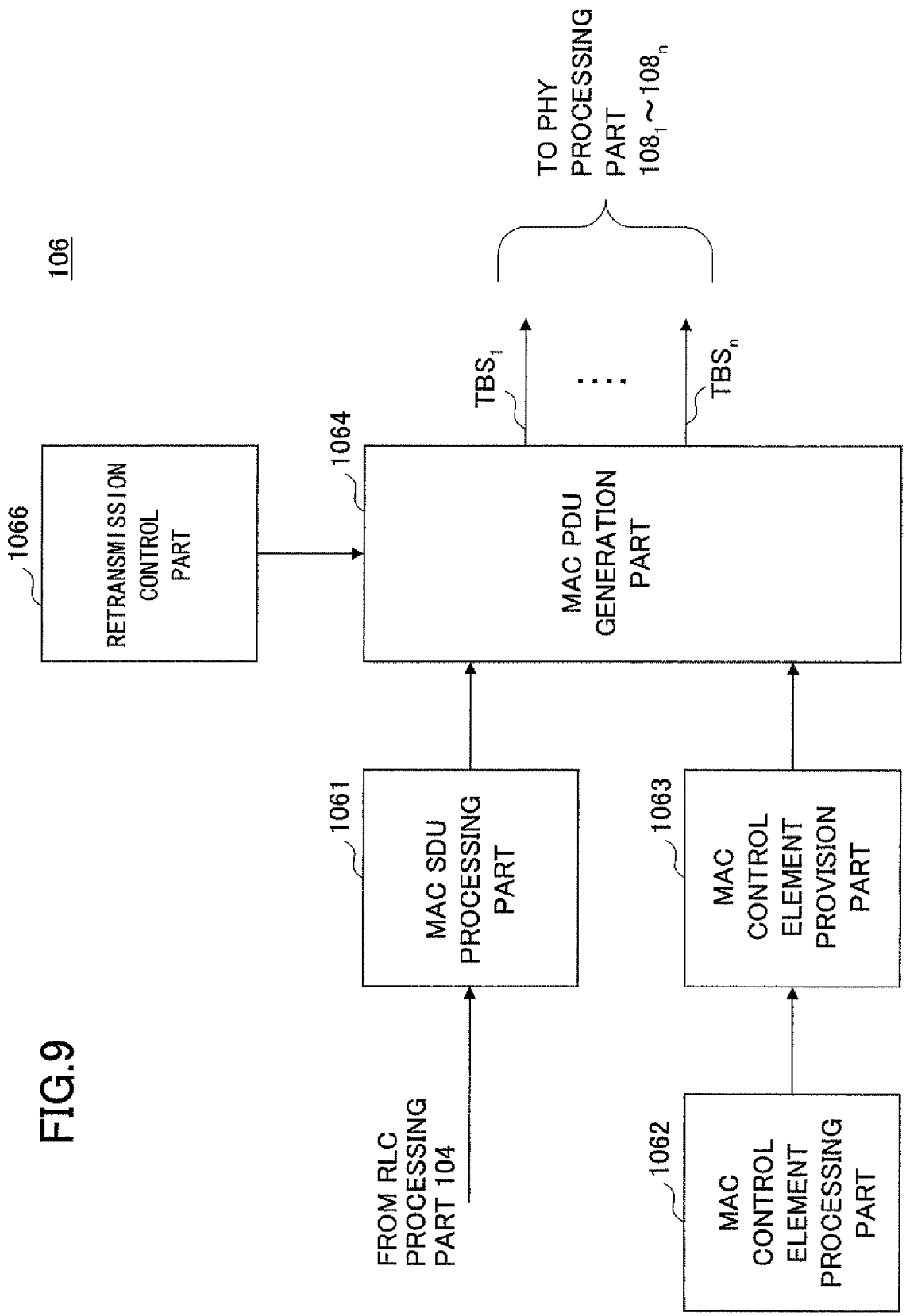
FIG. 9 is a partial block diagram illustrating a configuration of the MAC processing part of the radio communications apparatus according to the first embodiment of the present invention.

A description is given, with reference to FIG. 9, of the MAC processing part 106 of the radio communications apparatus 100 provided in the mobile station.

The MAC processing part 106 includes the MAC SDU processing part 1061. The MAC SDU processing part 1061 divides the signal (RLC PDU) input by the RLC processing part 104 (FIG. 6), and inputs the divided RLC PDU to the MAC PDU generation part 1064. For example, the same as in the radio communications apparatus 100 illustrated with reference to FIG. 7, the MAC SDU processing part 1061 divides the input RLC PDU, thereby generating multiple MAC SDUs, and inputs the generated MAC SDUs to the MAC PDU generation part 1064. The MAC SDU may be referred to as "code word (CW)." As described above with reference to FIG. 8, the signal (RLC PDU) input by the RLC processing part 104 is divided into the two RLC PDUs 52*a* and 52*b*. The generated RLC PDUs 52*a* and 52*b* are input to the MAC PDU generation part 1064 as the MAC SDUs 54*a* and 54*b*, respectively.

Alternatively, the MAC SDU generation part 1061 may unite signals (RLC PDUs) input by the RLC processing part 104 and input the united RLC PDUs to the MAC PDU generation part 1064. For example, the MAC SDU generation part 1061 generates a MAC SDU by uniting multiple RLC PDUs, and inputs the generated MAC SDU to the MAC PDU generation part 1064.

The MAC processing part 106 includes the MAC Control element processing part 1062. The MAC Control element processing part 1062 generates Layer 2 (L2) control information (Data Link Layer control information) transmitted in Layer 2 (L2). The Layer 2 control information includes a MAC Control element. In this embodiment, a description is given of the case of transmitting a MAC Control element as an example of the Layer 2 control information. However, the Layer 2 control information may include control information other than the MAC Control element as long as the control information is transmitted in Layer 2. Then, the MAC Control element processing part 1062 inputs the generated MAC Control element to the MAC Control element provision part 1063. For example, the MAC Control element includes at least one information item selected from a Short Buffer Status Report, a Long Buffer Status Report, and padding.

The MAC processing part 106 includes the MAC Control element provision part 1063. The MAC Control element provision part 1063 generates multiple MAC Control elements to be provided to MAC SDUs from the MAC Control element input by the MAC Control element processing part 1062. For example, the MAC Control element provision part 1063 may multiple MAC Control elements by copying the MAC Control element input by the MAC Control element processing part 1062. For example, the MAC Control element provision part 1063 may generate as many MAC Control elements as the antennas 112₁ through 112*ₙ* (FIG. 6) by reproducing the MAC Control element. If the number of antennas is three or more, the number of MAC Control elements copied may be different from the number of antennas as long as at least two MAC Control elements are copied (reproduced) from the input MAC Control element. The MAC control element provision part 1063 inputs the generated MAC control elements to the MAC PDU generation part 1064.

The MAC processing part 106 includes the retransmission control part 1066. The retransmission control part 1066 controls retransmission of the L2 control information.

The MAC processing part 106 includes the MAC PDU generation part 1064. The MAC PDU generation part 1064 attaches the MAC Control elements input by the MAC Control element provision part 1063 to the MAC SDUs input by the MAC SDU processing part 1061. Then, the MAC PDU generation part 1064 generates MAC PDUs by adding headers to the MAC SDUs having the MAC Control elements attached thereto. For example, the MAC PDU generation part 106 adds the MAC Control elements and headers to the MAC SDUs, thereby generating MAC PDUs to be transmitted from the antennas 112₁ through 112*ₙ*. Here, there may be a MAC PDU that does not include the MAC Control element among the generated MAC PDUs if at least two of the MAC PDUs generated include the MAC Control element.

Figure 10:
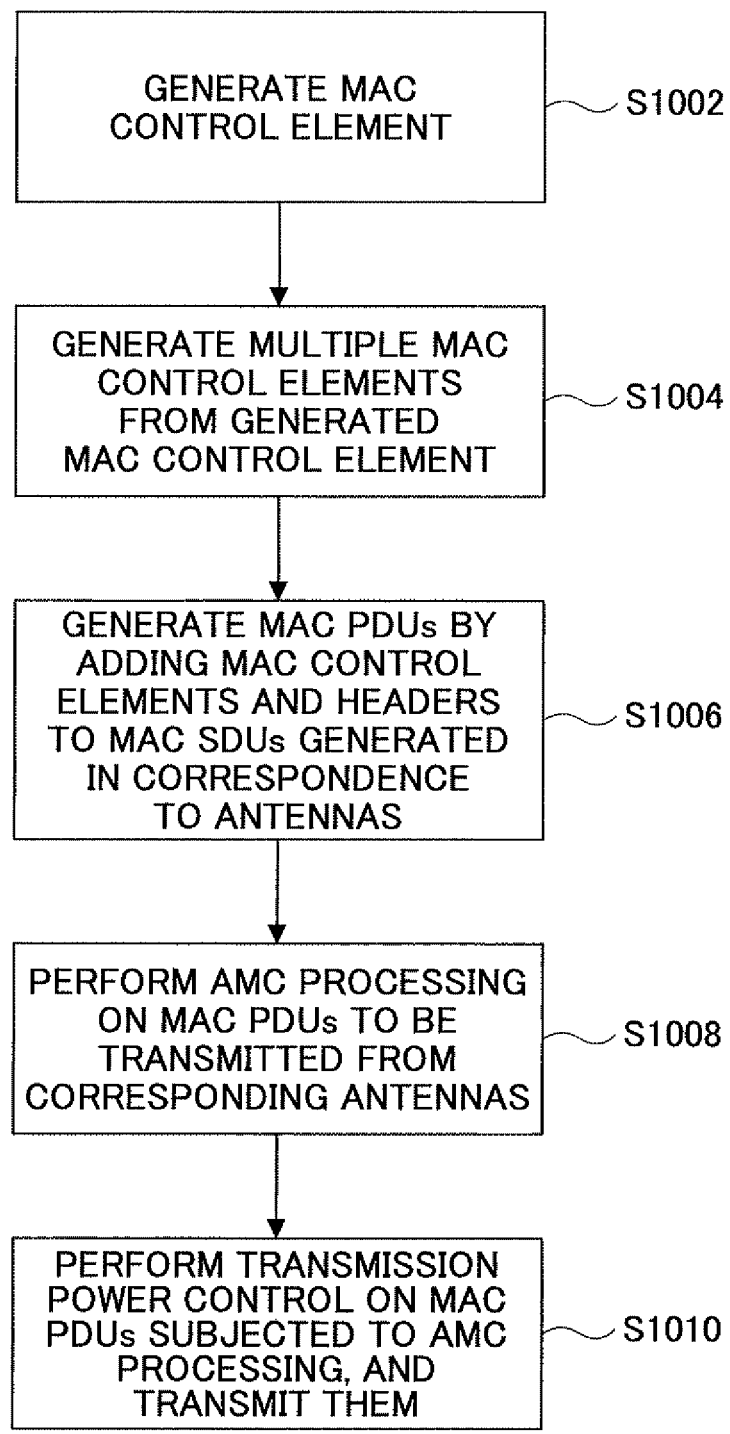
FIG. 10 is a flowchart illustrating operations of the radio communications apparatus according to the first embodiment of the present invention.

Next, a description is given, with reference to FIG. 10 as well as FIG. 7 or FIG. 9, of operations of the radio communications apparatus 100 according to this embodiment.

First, in step S1002, the MAC Control element processing part 1062 generates a MAC Control element.

In step S1004, the MAC Control element provision part 1063 generates multiple MAC Control elements (multiple copies of the MAC Control element) by copying the MAC Control element generated in step S1002.

In step S1006, the MAC PDU generation part 1064 generates MAC PDUs by adding the MAC Control elements and headers to MAC SDUs generated for the corresponding antennas 112₁ through 112*ₙ* (FIG. 6) in the MAC SDU processing part 1061.

In step S1008, the PHY processing parts 108₁ through 108*ₙ* (FIG. 6) perform AMC on the input MAC PDUs.

In step S1010, the transmission part 110 controls transmission power for the input MAC PDUs subjected to AMC, and transmits them.

According to this embodiment, a MAC Control element is transmitted, or copies of the MAC Control element are transmitted, through multiple antennas, so that it is possible to reduce reception error of the MAC Control element at the receiving end. Specifically, it is satisfactory if the MAC Control element transmitted from one of the multiple antennas is received without error. Accordingly, it is possible to reduce decoding error at the receiving end.

[Second Embodiment]

Next, a description is given of a second embodiment of the present invention. A radio communications system to which the radio communications apparatus 100 according to this embodiment is applied is the same as described above in the first embodiment.

The radio communications apparatus 100 according to this embodiment has the same configuration as described above with reference to FIG. 6. Further, the MAC processing part 106 of the radio communications apparatus 100 according to this embodiment has the same configuration as described above with reference to FIG. 7 and FIG. 9.

The radio communications apparatus 100 according to this embodiment is different from that of the first embodiment in the processing of the MAC Control element provision part 1063.

The MAC Control element provision part 1063 of the radio communications apparatus 100 according to this embodiment generates multiple MAC Control elements to be provided to MAC SDUs from a MAC Control element input by the MAC Control element processing part 1062.

For example, the MAC Control element provision part 1063 may generate multiple MAC Control elements by dividing the MAC Control element input by the MAC Control element processing part 1062. For example, the MAC Control element provision part 1063 divides a field of the input MAC Control element. That is, the MAC Control element provision part 1063 generates multiple MAC Control elements by dividing the control information included in a field of the input MAC Control element. Specifically, if the radio communications apparatus 100 is included in the base station, each of the information items included in the MAC Control element—the RACH Message 2, Timing Advance, DRX, and padding—may be divided. Here, it is also possible to have the information partially divided. In other words, at least one of the RACH Message 2, Timing Advance, DRX, and padding included in the MAC Control element is divided. Here, for example, the condition of the division is preset by the system. As a result of the division, the MAC Control element included in each MAC PDU is indicated by a header.

Further, if the radio communications apparatus 100 is included in the mobile station, each of the information items included in the MAC Control element—the Short Buffer Status Report, Long Buffer Status Report, and padding—may be divided. Here, it is also possible to have the information partially divided. In other words, at least one of the Short Buffer Status Report, Long Buffer Status Report, and padding included in the MAC Control element is divided. Here, for example, the condition of the division is preset by the system. As a result of the division, the MAC Control element included in each MAC PDU is indicated by a header.

For example, the MAC Control element provision part 1063 may generate as many MAC Control elements as the antennas $112_1$ through $112_n$ (FIG. 6) by dividing the MAC Control element. If the number of antennas is three or more, the number of MAC Control elements into which the input MAC Control element is divided may be different from the number of antennas as long as the input MAC Control element is divided into at least two MAC Control elements. The MAC Control element provision part 1063 inputs the generated MAC Control elements to the MAC PDU generation part 1064.

Figure 11:
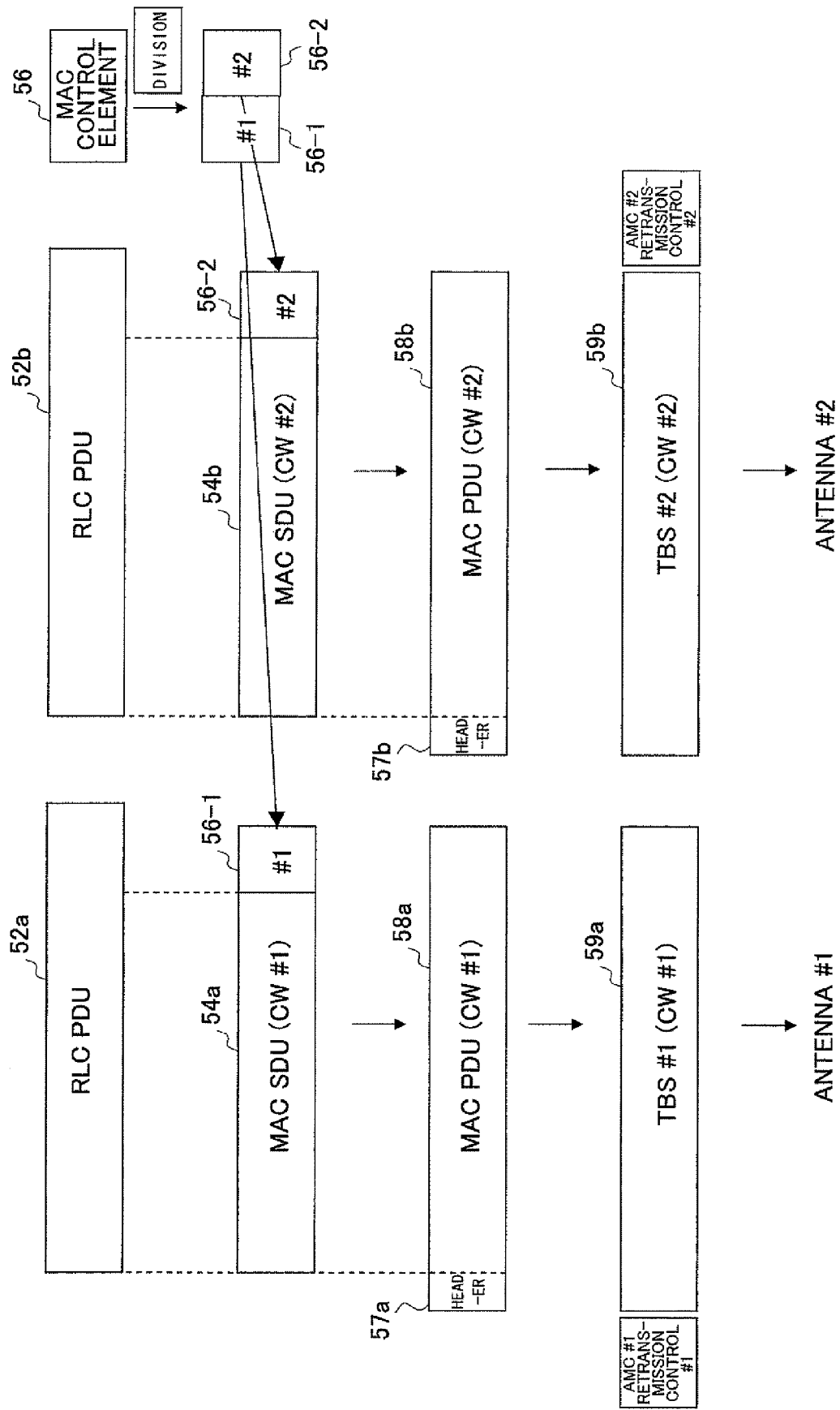
FIG. 11 is a diagram illustrating processing in the radio communications apparatus according to a second embodiment of the present invention.

The MAC PDU generation part 1064 of the radio communications apparatus 100 according to this embodiment generates MAC PDUs by adding the MAC Control elements input by the MAC Control element provision part 1063 to the MAC SDUs input by the MAC SDU processing part 1061. For example, the MAC PDU generation part 1064 adds the MAC Control elements and headers to the MAC SDUs, thereby generating MAC PDUs to be transmitted from the corresponding antennas $112_1$ through $112_n$. The MAC PDU generation part 1064 processes the generated MAC PDUs into transport block sizes, and inputs the processed MAC PDUs to the corresponding PHY processing parts $108_1$ through $108_n$ (FIG. 6) corresponding to the antennas $112_1$ through $112_n$. FIG. 11 illustrates the case where the number of the antennas $112_1$ through $112_n$ of the radio communications apparatus 100 is two. For example, as illustrated in FIG. 11, the MAC PDU generation part 1064 adds MAC Control elements 56-1 (#1) and 56-2 (#2) into which a MAC Control element 56 is divided to the MAC SDUs 54*a* and 54*b*. Then, the MAC PDU generation part 1064 adds the headers 57*a* and 57*b* to the MAC SDUs 54*a* and 54*b* with the MAC Control elements 56-1 and 56-2, thereby generating the MAC PDUs 58*a* and 58*b*. The MAC PDU generation part 1064 processes the generated MAC PDUs 58*a* and 58*b* into the transport block sizes TBS #59*a* and TBS #2 59*b*, and inputs the processed MAC PDUs 58*a* and 58*b* to the corresponding PHY processing parts $108_1$ and $108_2$ corresponding to the antennas $112_1$ and $112_2$. Here, there may be a MAC PDU that does not include the MAC Control element among the generated MAC PDUs if at least two of the MAC PDUs generated include the MAC Control element.

Next, a description is given of operations of the radio communications apparatus 100 according to this embodiment.

The operations of the radio communications apparatus 100 according to this embodiment are different from the operations described with reference to FIG. 10 in the processing of step S1004.

In the radio communications apparatus 100 according to this embodiment, in step S1004, the MAC Control element provision part 1063 generates multiple MAC Control elements by dividing the MAC Control element generated in step S1002. For example, the MAC Control element provision part 1063 generates multiple MAC Control elements by dividing the control information itself included in a field of the MAC Control element generated in step S1002.

According to this embodiment, the MAC Control element is divided and transmitted through multiple antennas. Therefore, it is possible to reduce reception error of the MAC Control element at the receiving end. For example, even if signals transmitted from some of the multiple antennas from which the MAC Control element is transmitted are not received with good quality, decoding may be possible if the MAC Control element transmitted from other antennas is received with good quality, because error correction is performed antenna by antenna. Accordingly, it is possible to reduce decoding error at the receiving end.

[Third Embodiment]

Next, a description is given of a third embodiment of the present invention. A radio communications system to which the radio communications apparatus 100 according to this embodiment is applied is the same as described above in the first embodiment.

The radio communications apparatus 100 according to this embodiment has the same configuration as described above with reference to FIG. 6. Further, the MAC processing part 106 of the radio communications apparatus 100 according to this embodiment has the same configuration as described above with reference to FIG. 7 and FIG. 9.

The radio communications apparatus 100 according to this embodiment is different from those of the first and second embodiments in the processing of the MAC Control element provision part 1063.

The MAC Control element provision part 1063 of the radio communications apparatus 100 according to this embodiment generates multiple MAC Control elements to be provided to MAC SDUs from a MAC Control element input by the MAC Control element processing part 1062.

For example, the MAC Control element provision part 1063 may generate multiple MAC Control elements by dividing the MAC Control element input by the MAC Control element processing part 1062. For example, the MAC Control element provision part 1063 divides the input MAC Control element in units of information items included in a field of the input MAC Control element (on an information-item basis).

Specifically, if the radio communications apparatus 100 is included in the base station, the input MAC Control element is divided in units of the information items included therein—the RACH Message 2, Timing Advance, DRX, and padding. In other words, the control information included in the input MAC Control element is divided into multiple groups. Here, for example, the condition of the division is preset by the system. As a result of the division, the MAC Control element included in each MAC PDU is indicated by a header.

Further, if the radio communications apparatus 100 is included in the mobile station, the input MAC Control element is divided in units of the information items included therein—the Short Buffer Status Report, Long Buffer Status Report, and padding. Here, for example, the condition of the division is preset by the system. As a result of the division, the MAC Control element included in each MAC PDU is indicated by a header.

For example, the MAC Control element provision part 1063 may generate as many MAC Control elements as the antennas $112_1$ through $112_n$ (FIG. 6) by dividing the MAC Control element. If the number of antennas is three or more, the number of MAC Control elements into which the input MAC Control element is divided may be different from the number of antennas as long as the input MAC Control element is divided into at least two MAC Control elements. The MAC Control element provision part 1063 inputs the generated MAC Control elements to the MAC PDU generation part 1064.

Figure 12:
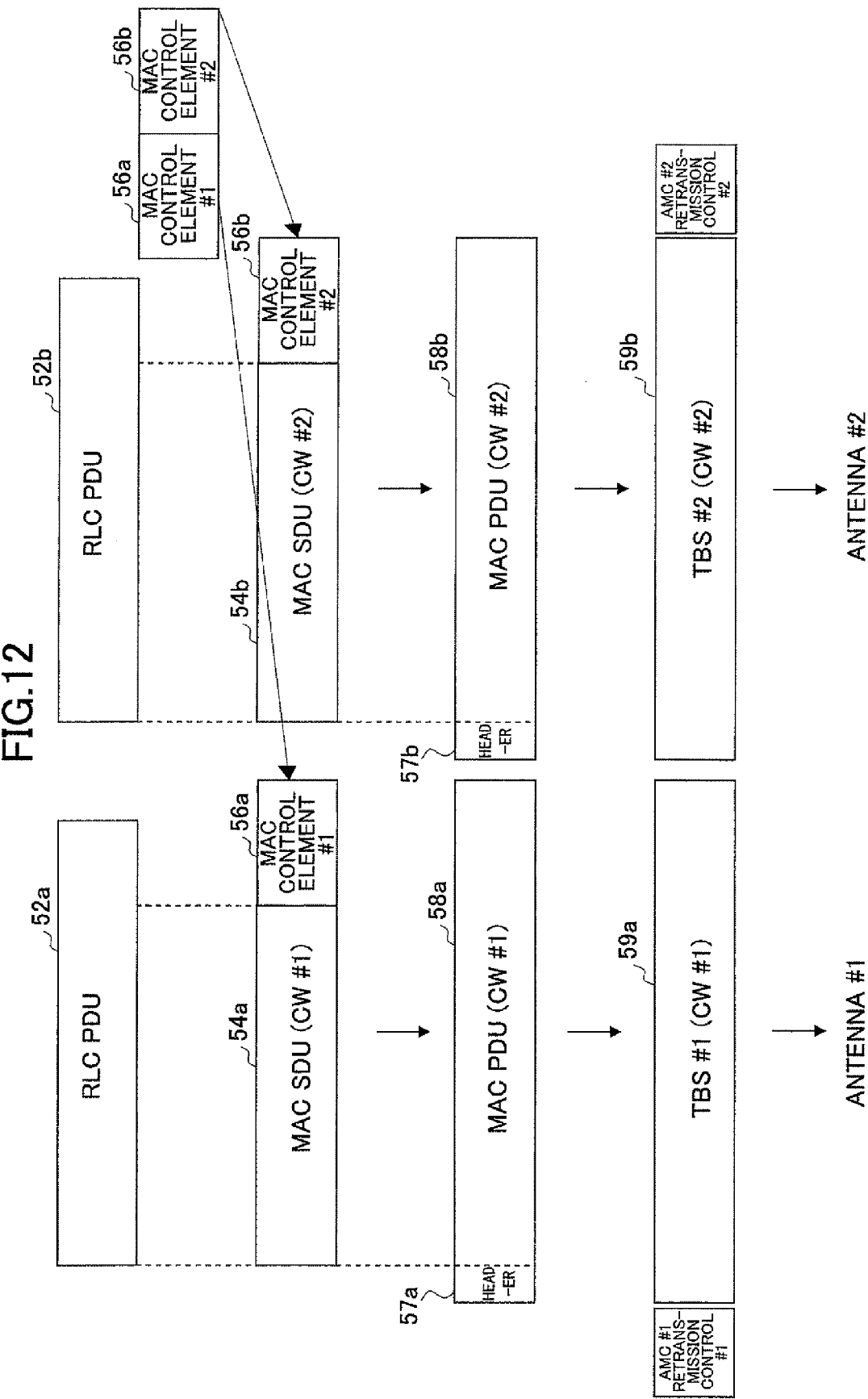
FIG. 12 is a diagram illustrating processing in the radio communications apparatus according to a third embodiment of the present invention.

The MAC PDU generation part 1064 of the radio communications apparatus 100 according to this embodiment generates MAC PDUs by adding the MAC Control elements input by the MAC Control element provision part 1063 to the MAC SDUs input by the MAC SDU processing part 1061. For example, the MAC PDU generation part 1064 adds the MAC Control elements and headers to the MAC SDUs, thereby generating MAC PDUs to be transmitted from the corresponding antennas $112_1$ through $112_n$. The MAC PDU generation part 1064 processes the generated MAC PDUs into transport block sizes, and inputs the processed MAC PDUs to the corresponding PHY processing parts $108_1$ through $108_n$ (FIG. 6) corresponding to the antennas $112_1$ through $112_n$. FIG. 12 illustrates the case where the number of the antennas $112_1$ through $112_n$ of the radio communications apparatus 100 is two. For example, as illustrated in FIG. 12, the MAC PDU generation part 1064 adds MAC Control elements 56a and 56b (MAC Control element #1 and MAC Control element #2) to the MAC SDUs 54a and 54b. Then, the MAC PDU generation part 1064 adds the headers 57a and 57b to the MAC SDUs 54a and 54b with the MAC Control elements 56a and 56b, thereby generating the MAC PDUs 58a and 58b. The MAC PDU generation part 1064 processes the generated MAC PDUs 58a and 58b into the transport block sizes TBS #59a and TBS #2 59b, and inputs the processed MAC PDUs 58a and 58b to the corresponding PHY processing parts $108_1$ and $108_2$ corresponding to the antennas $112_1$ and $112_2$. Here, there may be a MAC PDU that does not include the MAC Control element among the generated MAC PDUs if at least two of the MAC PDUs generated include the MAC Control element.

Next, a description is given of operations of the radio communications apparatus 100 according to this embodiment.

The operations of the radio communications apparatus 100 according to this embodiment are different from the operations described with reference to FIG. 10 in the processing of step S1004.

In the radio communications apparatus 100 according to this embodiment, in step S1004, the MAC Control element provision part 1063 generates multiple MAC Control elements by dividing the MAC Control element generated in step S1002. For example, the MAC Control element provision part 1063 generates multiple MAC Control elements by dividing the MAC Control element generated in step S1002 in units of the control information items included therein.

According to this embodiment, the MAC Control element is divided in units of the control information items included therein, and is transmitted through multiple antennas. Therefore, it is possible to reduce reception error of the MAC Control element at the receiving end. For example, even if signals transmitted from some of the multiple antennas from which the MAC Control element is transmitted are not received with good quality, decoding may be possible if the MAC Control element transmitted from other antennas is received with good quality, because error correction is performed antenna by antenna. Accordingly, it is possible to reduce decoding error at the receiving end. Further, it is possible to increase the amount of transmittable information of the MAC Control element.

[Fourth Embodiment]

Next, a description is given of a fourth embodiment of the present invention. A radio communications system to which the radio communications apparatus 100 according to this embodiment is applied is the same as described above in the first embodiment.

The radio communications apparatus 100 according to this embodiment has the same configuration as described above with reference to FIG. 6. Further, the MAC processing part 106 of the radio communications apparatus 100 according to this embodiment has the same configuration as described above with reference to FIG. 7 and FIG. 9.

The radio communications apparatus 100 according to this embodiment is different from those of the first through third embodiments in the processing of the MAC Control element provision part 1063 and the processing of the transmission part 110.

The MAC Control element provision part 1063 of the radio communications apparatus 100 according to this embodiment determines the antenna through which the MAC Control element input by the MAC Control element processing part 1062 is to be transmitted. The MAC Control element provision part 1063 inputs the MAC Control element to the MAC PDU generation part 1064. The MAC Control element provision part 1063 inputs information on the antenna through which the MAC Control element is to be transmitted to the transmission part 110 as provision information.

Figure 13:
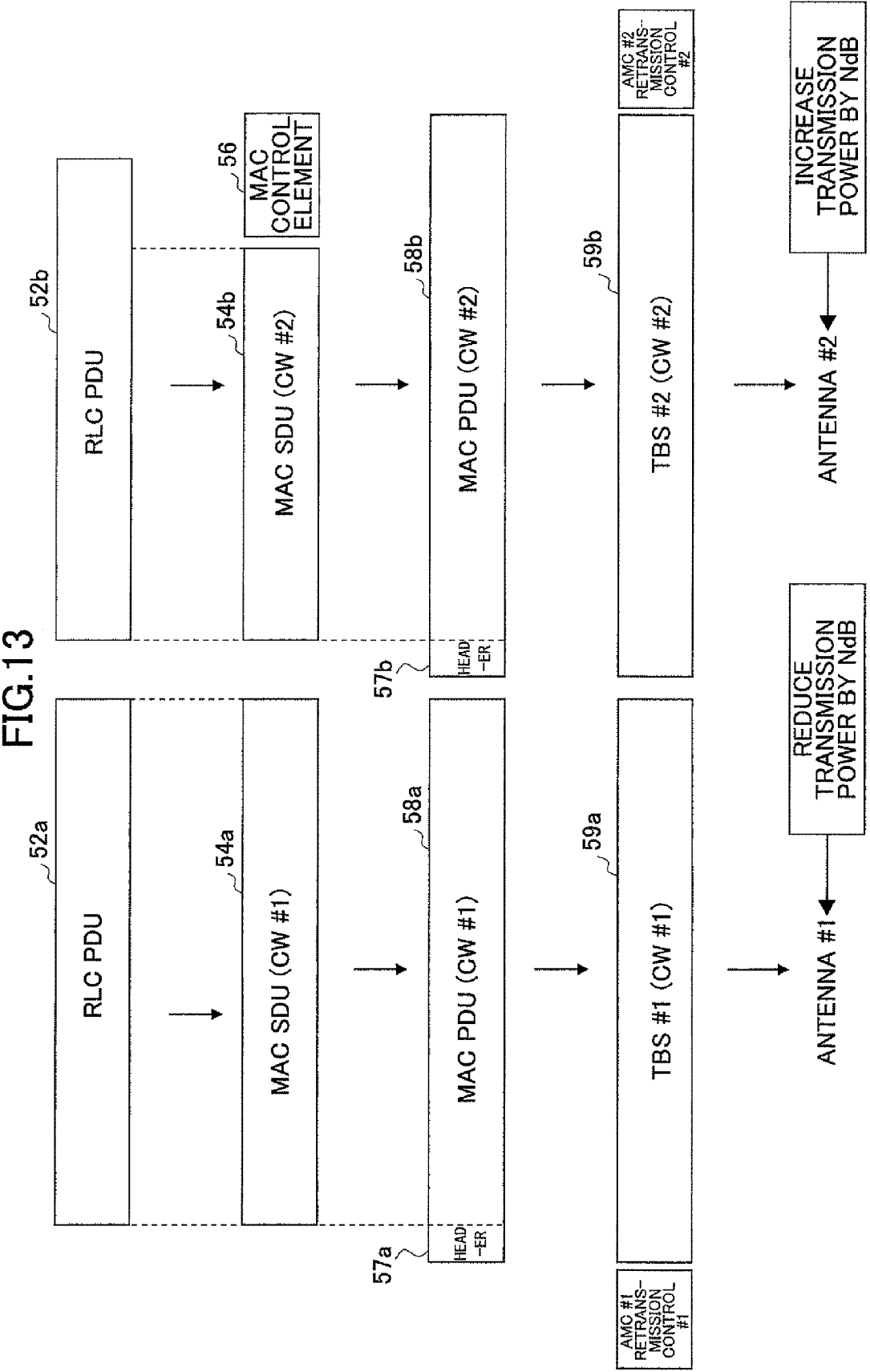
FIG. 13 is a diagram illustrating processing in the radio communications apparatus according to a fourth embodiment of the present invention.

The MAC PDU generation part 1064 of the radio communications apparatus 100 according to this embodiment generates MAC PDUs from the MAC SDUs input by the MAC SDU processing part 1061. In generating MAC PDUs, the MAC PDU generation part 1064 adds the MAC Control element to one of the MAC SDUs corresponding to the antenna (one of the antennas $112_1$ through $112_n$ illustrated in FIG. 6) through which the MAC Control element is to be transmitted. Thus, the MAC PDU generation part 1064 generates MAC PDUs to be transmitted from the corresponding antennas $112_1$ through $112_n$. The MAC PDU generation part 1064 processes the generated MAC PDUs into transport block sizes, and inputs the processed MAC PDUs to the corresponding PHY processing parts $108_1$ through $108_n$ (FIG. 6) corresponding to the antennas $112_1$ through $112_n$. FIG. 13 illustrates the case where the number of the antennas $112_1$ through $112_n$ of the radio communications apparatus 100 is two. For example, as illustrated in FIG. 13, the MAC PDU generation part 1064 adds the MAC Control element 56 to the MAC SDU 54b (one of the MAC SDUs 54a and 54b). Then, the MAC PDU generation part 1064 adds the headers 57a and 57b to the MAC SDUs 54a and 54b, respectively, thereby generating the MAC PDUs 58a and 58b. The MAC PDU generation part 1064 processes the generated MAC PDUs 58a and 58b into the transport block sizes TBS #59a and TBS #2 59b, and inputs the processed MAC PDUs 58a and 58b to the corresponding PHY processing parts $108_1$ and $108_2$ corresponding to the antennas $112_1$ and $112_2$.

The transmission part 110 of the radio communications apparatus 100 according to this embodiment, based on the provision information input by the MAC Control element provision part 1063, increase transmission power (level) for the control information to be transmitted from the antenna (one of the antennas $112_1$ through $112_n$) specified by the provision information.

Figure 14:
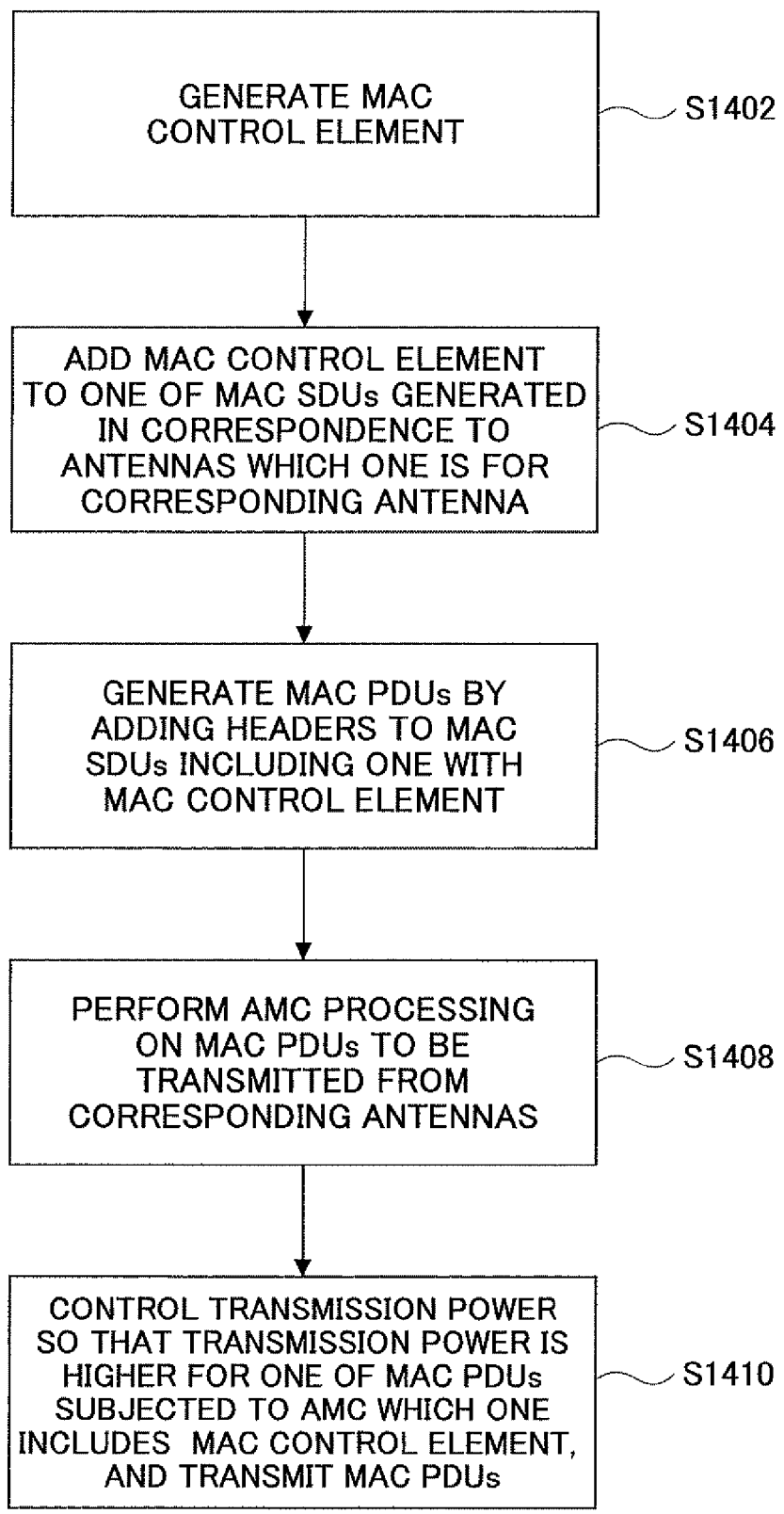
FIG. 14 is a flowchart illustrating operations of the radio communications apparatus according to the fourth embodiment of the present invention.

Next, a description is given, with reference to FIG. 14 as well as FIG. 7 or FIG. 9, of operations of the radio communications apparatus 100 according to this embodiment.

In step S1402, the MAC Control element processing part 1062 generates a MAC Control element.

In step S1404, the MAC PDU generation part 1064 adds the MAC Control element to one of the MAC SDUs generated in correspondence to the antennas $112_1$ through $112_n$ (FIG. 6)

generated in the MAC SDU processing part 1061, which one is for a corresponding one of the antennas $112_1$ through $112_n$. For example, the corresponding one of the antennas $112_1$ through $112_n$ may be predetermined.

In step S1406, the MAD PDU generation part 1064 adds headers to the MAC SDUs including the one with the MAC Control element, thereby generating MAC PDUs.

In step S1408, the PHY processing parts $108_1$ through $108_n$ (FIG. 6) perform AMC on the input MAC PDUs.

In step S1410, the transmission part 110 controls transmission power so that the transmission power is higher for the one of the MAC PDUs subjected to AMC which one includes the MAC Control element than for the other MAC PDUs (which do not include the MAC Control element).

In this embodiment, a description is given of the case where the number of MAC PDUs including the MAC Control element is one. Alternatively, a number of copies of the MAC Control element less than the number of antennas may be made or the MAC Control element may be divided into a number of pieces less than the number of antennas, and multiple MAC PDUs including the corresponding MAC Control element copies or pieces may be generated. In this case, the MAC Control element may be copied or divided in the same manner as in any of the above-described first through third embodiments. In this case, the transmission part 110 may control transmission power so that the transmission power is higher for the MAC PDUs including the MAC Control element (copies or pieces) than for the other MAC PDUs (which do not include the MAC Control element).

According to this embodiment, the transmission power is controlled so as to be higher for a MAC PDU including a MAC Control element. Therefore, it is possible to increase the reception quality of the MAC Control element. Accordingly, it is possible to reduce reception error of the MAC Control element at the receiving end.

[Fifth Embodiment]

Next, a description is given of a fifth embodiment of the present invention. A radio communications system to which the radio communications apparatus 100 according to this embodiment is applied is the same as described above in the first embodiment.

The radio communications apparatus 100 according to this embodiment has the same configuration as described above with reference to FIG. 6. Further, the MAC processing part 106 of the radio communications apparatus 100 according to this embodiment has the same configuration as described above with reference to FIG. 7 and FIG. 9.

The radio communications apparatus 100 according to this embodiment is different from that of the fourth embodiment in the processing of the MAC PDU generation part 1064 and the processing of the transmission part 110.

The MAC PDU generation part 1064 of the radio communications apparatus 100 according to this embodiment generates MAC PDUs from the MAC SDUs input by the MAC SDU processing part 1061. In generating MAC PDUs, the MAC PDU generation part 1064 adds the MAC Control element input by the MAC Control element provision part 1063 to, for example, one of the MAC SDUs. Thus, the MAC PDU generation part 1064 generates MAC PDUs to be transmitted from the corresponding antennas $112_1$ through $112_n$. For example, the MAC PDU generation part 1064 adds the MAC Control element to one or more of the MAC SDUs based on the priority information added to the MAC SDUs. For example, if the radio communications apparatus 100 is included in the base station, the priority information is included in the data (MAC SDUs) transmitted from an upper (superior) station. Further, if the radio communications apparatus 100 is included in the mobile station, the priority information is included in the data (MAC SDUs) transmitted by the mobile station. The MAC PDU generation part 1064 adds the MAC Control element to one or more of the MAC SDUs having high or higher priority based on the priority information added to the MAC SDUs. The MAC PDU generation part 1064 processes the generated MAC PDUs into transport block sizes, and inputs the processed MAC PDUs to the corresponding PHY processing parts $108_1$ through $108_n$ corresponding to the antennas $112_1$ through $112_n$.

Figure 15:
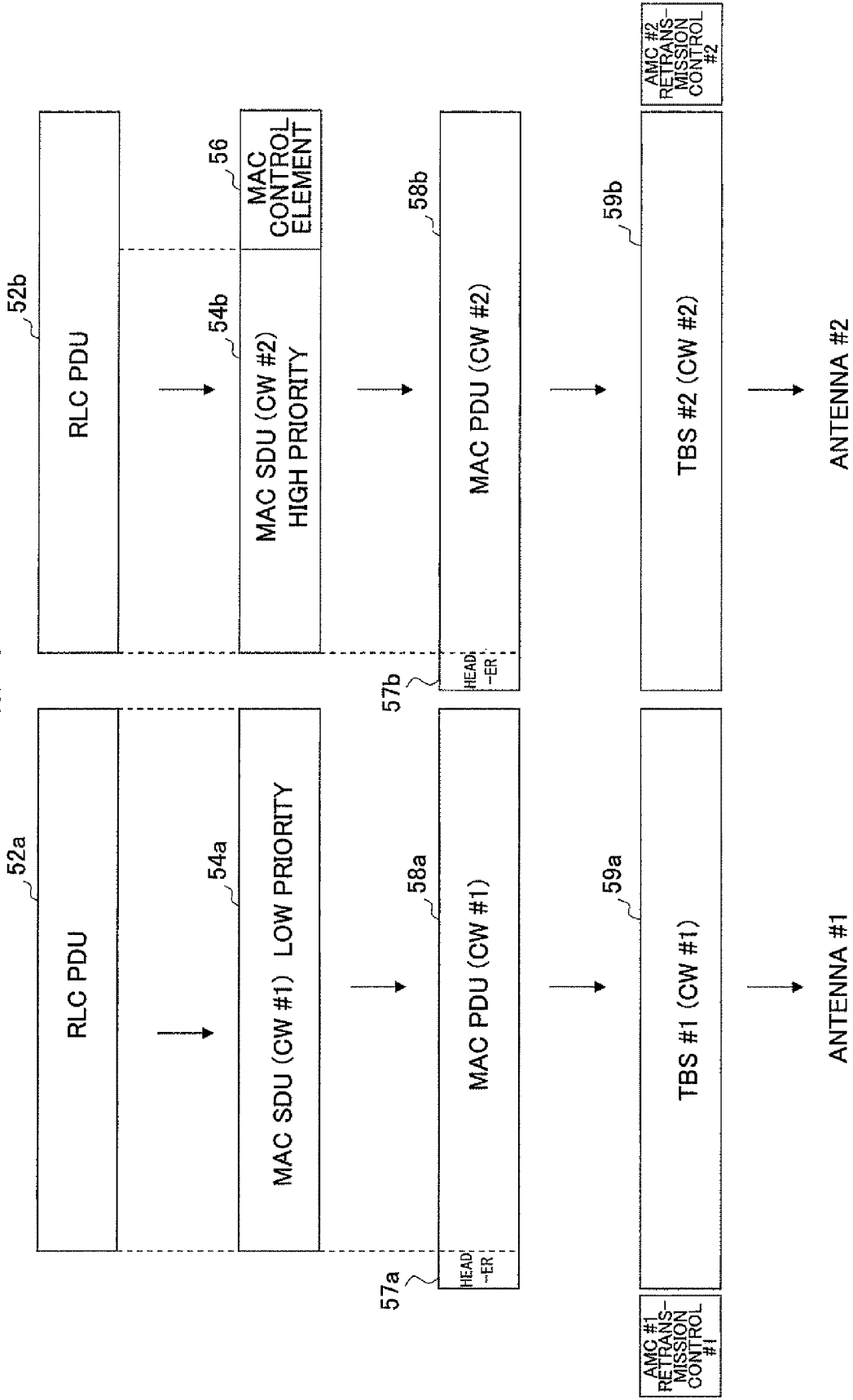
FIG. 15 is a diagram illustrating processing in the radio communications apparatus according to a fifth embodiment of the present invention.

FIG. 15 illustrates the case where the number of the antennas $112_1$ through $112_n$ of the radio communications apparatus 100 is two. For example, as illustrated in FIG. 15, the MAC PDU generation part 1064 adds the MAC Control element 56 to the MAC SDU 54b having higher priority as indicated by the priority information included therein. Then, the MAC PDU generation part 1064 attaches the headers 57a and 57b to the MAC SDU 54a and the MAC SDU 54b to which the MAC Control element 56 is added, respectively, thereby generating the MAC PDUs 58a and 58b. The MAC PDU generation part 1064 processes the generated MAC PDUs 58a and 58b into the transport block sizes TBS #59a and TBS #2 59b, and inputs the processed MAC PDUs 58a and 58b to the corresponding PHY processing parts $108_1$ and $108_2$ (FIG. 6) corresponding to the antennas $112_1$ and $112_2$ (FIG. 6). FIG. 15 illustrates the case where the MAC SDU 54b to be transmitted from the antenna #2 is higher in priority (for example, transmission priority) than the MAC SDU 54a to be transmitted from the antenna #1.

Figure 16:
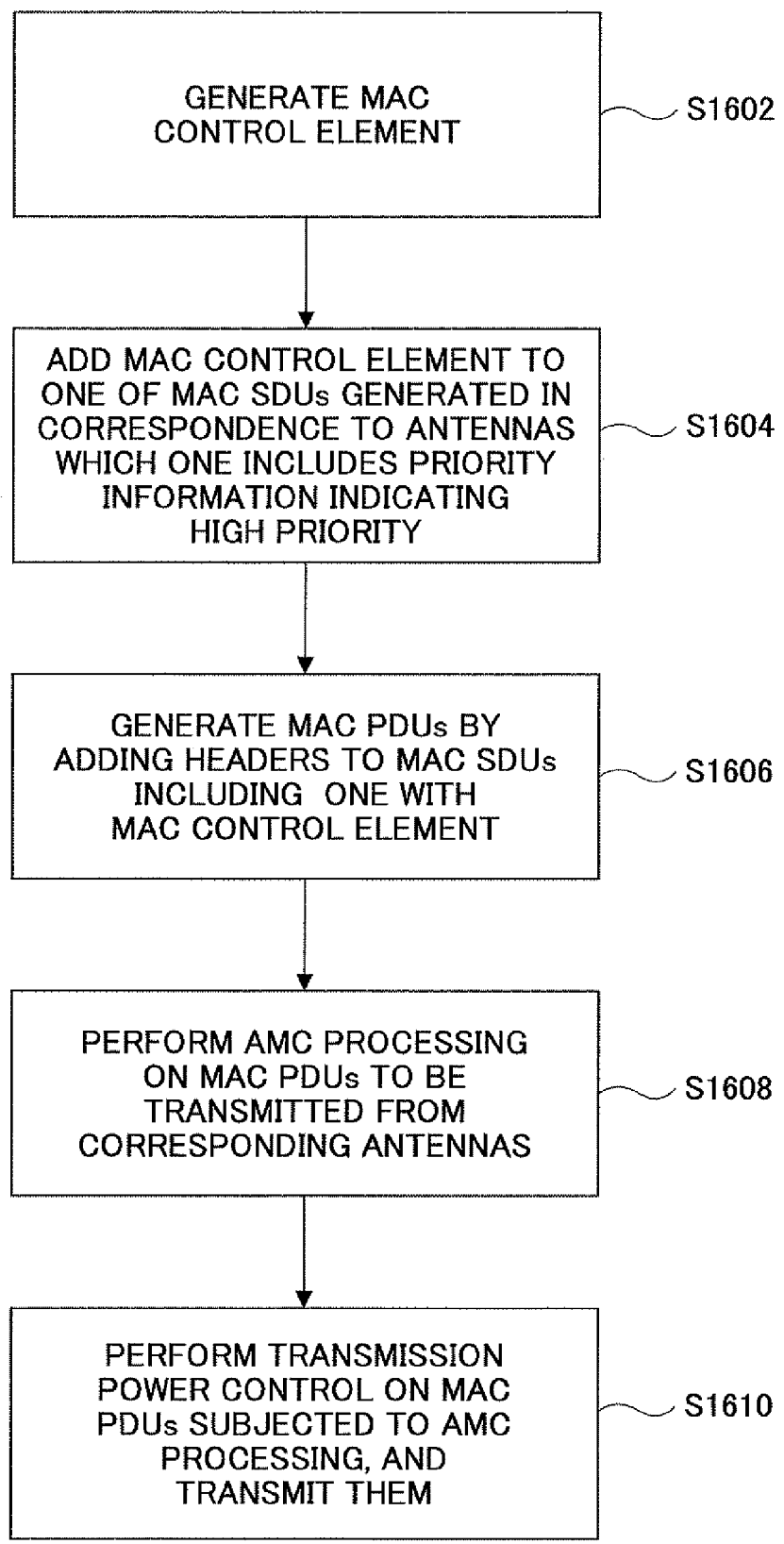
FIG. 16 is a flowchart illustrating operations of the radio communications apparatus according to the fifth embodiment of the present invention.

Next, a description is given, with reference to FIG. 16 as well as FIG. 7 or FIG. 9, of operations of the radio communications apparatus 100 according to this embodiment.

In step S1602, the MAC Control element processing part 1062 generates a MAC Control element.

In step S1604, the MAC PDU generation part 1064 adds the MAC Control element to, for example, one of the MAC SDUs generated in correspondence to the antennas $112_1$ through $112_n$ (FIG. 6) in the MAC SDU processing part 1061, which one includes priority information indicating high priority.

In step S1606, the MAD PDU generation part 1064 adds headers to the MAC SDUs including the one with the MAC Control element, thereby generating MAC PDUs.

In step S1608, the PHY processing parts $108_1$ through $108_n$ (FIG. 6) perform AMC on the input MAC PDUs.

In step S1610, the transmission part 110 controls transmission power for the input MAC PDUs subjected to AMC, and transmits them.

According to this embodiment, the number of MAC PDUs including the MAC Control element may be, but is not limited to, one. A number of copies of the MAC Control element less than the number of antennas may be made or the MAC Control element may be divided into a number of pieces less than the number of antennas, and the MAC Control element copies or pieces may be generated and added to multiple MAC PDUs having high priority. In this case, the MAC Control element may be copied or divided in the same manner as in any of the above-described first through third embodiments.

According to this embodiment, transmission is performed so that the reception quality at the receiving end improves in proportion to the priority indicated by priority information. Accordingly, by attaching the MAC Control element to a MAC SDU having high priority information, the MAC Control element is transmitted under conditions for good reception quality. Therefore, it is possible to improve the reception quality of the MAC Control element. As a result, it is possible to reduce reception error of the MAC Control element at the receiving end.

[Sixth Embodiment]

Next, a description is given of a sixth embodiment of the present invention. A radio communications system to which the radio communications apparatus 100 according to this embodiment is applied is the same as described above in the first embodiment.

The radio communications apparatus 100 according to this embodiment has the same configuration as described above with reference to FIG. 6. Further, the MAC processing part 106 of the radio communications apparatus 100 according to this embodiment has the same configuration as described above with reference to FIG. 7 and FIG. 9.

The radio communications apparatus 100 according to this embodiment is different from those of the first through fourth embodiments in the processing of the MAC PDU generation part 1064 and the processing of the PHY processing part $108_1$ through $108_n$.

The MAC PDU generation part 1064 of the radio communications apparatus 100 according to this embodiment assigns MAC Control elements generated in the same manner as described above in any of the first through fourth embodiments to the corresponding one or more of the antennas $112_1$ through $112_n$, and inputs the generated MAC Control elements to the corresponding one or more of the PHY processing part $108_1$ through $108_n$. In other words, the MAC PDU generation part 1064 adds headers to the MAC Control elements input by the MAC Control element provision part 1063, thereby generating MAC PDUs. For example, the MAC PDU generation part 1064 generates MAC PDUs to be transmitted from the corresponding one or more of the antennas $112_1$ through $112_n$ from the input MAC Control elements. That is, in the radio communications apparatus 100 according to this embodiment, only the MAC Control elements may be transmitted. The MAC PDU generation part 1064 processes the generated MAC PDUs into transport block sizes, and inputs the processed MAC PDUs to the corresponding PHY processing parts $108_1$ through $108_n$ corresponding to the antennas $112_1$ through $112_n$.

Figure 17:
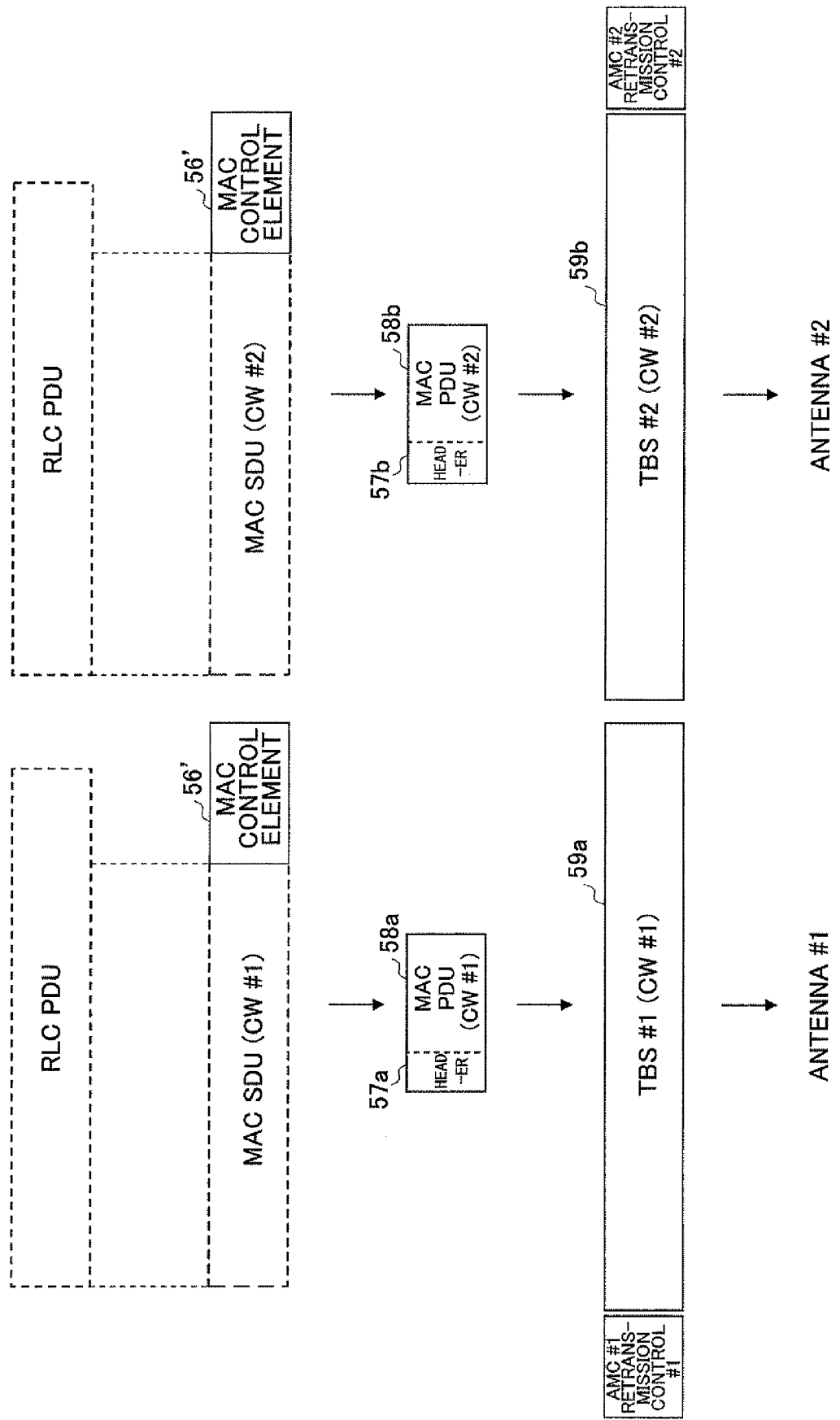
FIG. 17 is a diagram illustrating processing in the radio communications apparatus according to a sixth embodiment of the present invention.

FIG. 17 illustrates the case where the number of the antennas $112_1$ through $112_n$ of the radio communications apparatus 100 is two. For example, as illustrated in FIG. 17, the MAC PDU generation part 1064 attaches the headers 57a and 57b to the two MAC Control elements 56' (56-1 and 56-2 or 56a and 56b), thereby generating the MAC PDUs 58a and 58b. The MAC PDU generation part 1064 processes the generated MAC PDUs 58a and 58b into the transport block sizes TBS #59a and TBS #2 59b, and inputs the processed MAC PDUs 58a and 58b to the corresponding PHY processing parts $108_1$ and $108_2$ (FIG. 6) corresponding to the antennas $112_1$ and $112_2$ (FIG. 6).

The PHY processing parts $108_1$ through $108_n$ of the radio communications apparatus 100 according to this embodiment encode the input MAC PDUs at a coding rate of a small value.

For example, as illustrated in FIG. 17, the PHY processing parts $108_1$ and $108_2$ perform AMC on the MAC PDUs 58a and 58b input by the MAC PDU generation part 1064. For example, the PHY processing parts $108_1$ and $108_2$ perform AMC with a lower or reduced coding rate.

Figure 18:
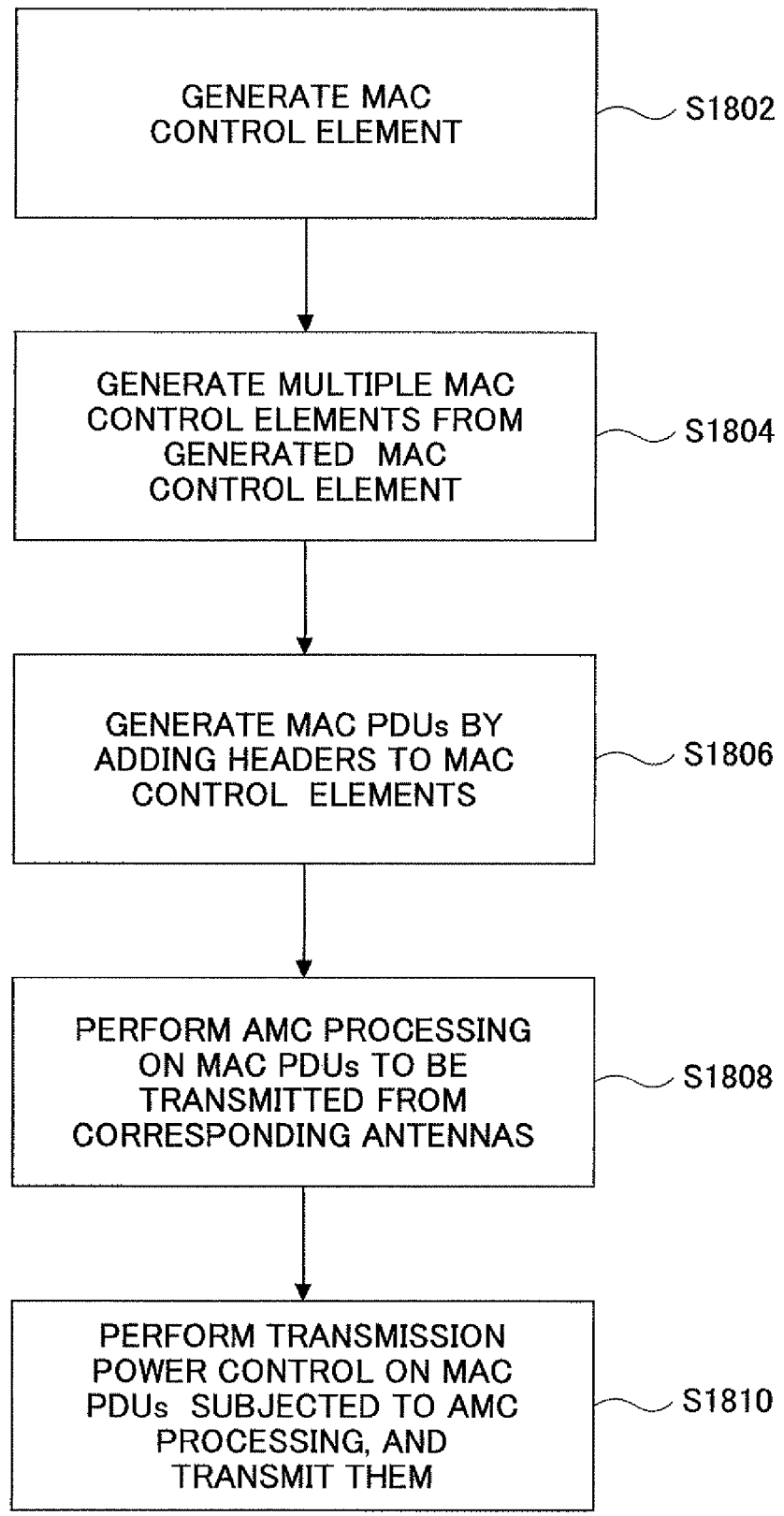
FIG. 18 is a flowchart illustrating operations of the radio communications apparatus according to the sixth embodiment of the present invention.

Next, a description is given, with reference to FIG. 18 as well as FIG. 7 or FIG. 9, of operations of the radio communications apparatus 100 according to this embodiment.

In step S1802, the MAC Control element processing part 1062 generates a MAC Control element.

In step S1804, the MAC Control element provision part 1063 generates multiple MAC Control elements from the MAC Control element generated in step S1002.

In step S1806, the MAC PDU generation part 1064 generates MAC PDUs by adding headers to the MAC Control elements.

In step S1808, the PHY processing parts $108_1$ through $108_n$ (FIG. 6) perform AMC on the input MAC PDUs. For example, the PHY processing parts $108_1$ through $108_n$ perform encoding at a coding rate of a small value.

In step S1810, the transmission part 110 controls transmission power for the input MAC PDUs subjected to AMC, and transmits them.

According to this embodiment, the MAC Control element is encoded at a lower or reduced coding rate. Therefore, it is possible to reduce reception error of the MAC Control element at the receiving end.

According to one embodiment of the present invention, a radio communications apparatus transmitting data using a plurality of antennas is provided that includes a data unit generation part configured to generate a plurality of first data units based on generated data link layer control information; and a physical layer processing part configure to perform adaptive modulation and coding on the first data units, wherein the data unit generation part is configured to generate the first data units by attaching the data link layer control information to at least one of second data units based on priority information included in the second data units.

Additionally, in the radio communications apparatus as set forth above, the data link layer control information may include a MAC Control element.

Additionally, in the radio communications apparatus as set forth above, the MAC Control element may include at least one of Random Access Channel Message 2, Timing Advance, Discontinuous Reception, and padding.

Additionally, in the radio communications apparatus as set forth above, the MAC Control element may include at least one of Short Buffer Status Report, Long Buffer Status Report, and padding.

According to one embodiment of the present invention, a communication method transmitting data using a plurality of antennas is provided that includes the steps of generating a plurality of data units so that a first one of the data units includes data link layer control information; performing adaptive modulation and coding on the data units; and assigning higher transmission power to the first one of the data units than to a second one of the data units without the data link layer control information.

According to one embodiment of the present invention, a communication method transmitting data using a plurality of antennas is provided that includes the steps of generating a plurality of first data units by attaching data link layer control information to a first one of second data units based on priority information included in the second data units, the first one of the second data units having a higher priority than a second of the second data units; and performing adaptive modulation and coding on the first data units.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification related to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A radio communications apparatus transmitting data using a plurality of antennas, the radio communications apparatus comprising:
- a data link layer control information generation part configured to generate a plurality of data link layer control information items by dividing generated data link layer control information;
- a data unit generation part configured to generate a plurality of data units to be transmitted through the corresponding antennas, based on the data link layer control information items generated by the data link layer control information generation part, wherein each of the plurality of data units includes a header and a corresponding one of the plurality of data link layer control information items; and
- a physical layer processing part configured to perform adaptive modulation and coding on the data units.

2. The radio communications apparatus as claimed in claim 1, wherein the data link layer control information includes a MAC Control element.

3. The radio communications apparatus as claimed in claim 2, wherein the MAC Control element includes at least one of Random Access Channel Message 2, Timing Advance, Discontinuous Reception, and padding.

4. The radio communications apparatus as claimed in claim 2, wherein the MAC Control element includes at least one of Short Buffer Status Report, Long Buffer Status Report, and padding.

5. The radio communications apparatus as claimed in claim 1, wherein the data link layer control information generation part is configured to generate the plurality of data link layer control information items by dividing control information included in a field of the data link layer control information.

6. The radio communications apparatus as claimed in claim 1, wherein the data link layer control information generation part is configured to generate the plurality of data link layer control information items by dividing the data link layer control information in units of control information items included in a field of the data link layer control information.

7. The radio communications apparatus as claimed in claim 1, wherein the physical layer processing part is configured to perform encoding on a first one of the plurality of data units at a lower coding rate than on a second one of the plurality of data units, the first one of the plurality of data units consisting of the header and the data link layer control information.

8. The radio communications apparatus as claimed in claim 1, wherein each of the plurality of data units is a MAC PDU.

9. A communication method transmitting data using a plurality of antennas, comprising the steps of:
- generating a plurality of data link layer control information items by dividing generated data link layer control information;
- generating a plurality of data units to be transmitted through the corresponding antennas, based on the generated plurality of data link layer control information items, wherein each of the plurality of data units includes a header and a corresponding one of the plurality of data link layer control information items; and
- performing adaptive modulation and coding on the data units.

* * * * *